(12) United States Patent
Yamaguchi et al.

(10) Patent No.: US 10,043,080 B2
(45) Date of Patent: Aug. 7, 2018

(54) SELF-POSITION CALCULATING APPARATUS AND SELF-POSITION CALCULATING METHOD

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 71 days.

(21) Appl. No.: 15/119,457

(22) PCT Filed: Feb. 24, 2014

(86) PCT No.: PCT/JP2014/054311
§ 371 (c)(1),
(2) Date: Aug. 17, 2016

(87) PCT Pub. No.: WO2015/125297
PCT Pub. Date: Aug. 27, 2015

(65) Prior Publication Data
US 2017/0011268 A1    Jan. 12, 2017

(51) Int. Cl.
*G06K 9/00* (2006.01)
*G01C 21/28* (2006.01)
(Continued)

(52) U.S. Cl.
CPC ......... *G06K 9/00798* (2013.01); *B60Q 1/085* (2013.01); *B60R 1/00* (2013.01);
(Continued)

(58) Field of Classification Search
CPC ...... G06K 9/00798; G06T 7/70; B60Q 1/085; B60R 1/10; G01B 21/265; G01B 21/28
See application file for complete search history.

(56) References Cited

U.S. PATENT DOCUMENTS 6,285,778 B1 *   9/2001   Nakajima ............ G05D 1/0248
                                                       180/167
9,446,652 B2 *   9/2016   Buma ................. B60G 17/0165
(Continued)

FOREIGN PATENT DOCUMENTS

JP    H06325298 A    11/1994
JP    2004198211 A    7/2004
(Continued)

OTHER PUBLICATIONS

European Search Opinion of EP 14883101A, dated Feb. 1, 2018, 7 pages.*

(Continued)

*Primary Examiner* — Mishawn Hunter
(74) *Attorney, Agent, or Firm* — Young Basile Hanlon & MacFarlane, P.C.

(57) ABSTRACT

A self-position calculating apparatus includes: a light projector 11 configured to project a patterned light beam 32a onto a road surface 31 around a vehicle; and a camera 12 configured to capture an image 38 of the road surface 31 around the vehicle including an area onto which the patterned light beam 32a is projected. The self-position calculating apparatus calculates an orientation angle of the vehicle 10 relative to the road surface 31 from a position of the patterned light beam 32a on the image 38 obtained by the camera 12, and calculates an amount of change in the orientation of the vehicle based on temporal changes in multiple feature points on the road surface which are detected from the image 38. The self-position calculating apparatus calculates current position and orientation angle of the vehicle by adding the amount of change in the orientation to initial position and orientation angle of the vehicle. If a condition under which the multiple feature points are (Continued)

detected does not satisfy a first criterion, the self-position calculating apparatus projects the patterned light beam 32a.

7 Claims, 17 Drawing Sheets

(51) Int. Cl.

| | | |
|---|---|---|
| *G06K 9/20* | (2006.01) | |
| *B60Q 1/08* | (2006.01) | |
| *B60R 1/00* | (2006.01) | |
| *G01B 11/26* | (2006.01) | |
| *G01C 21/26* | (2006.01) | |
| *G06K 9/62* | (2006.01) | |
| *G06T 7/20* | (2017.01) | |
| *G06T 7/70* | (2017.01) | |

(52) U.S. Cl.
CPC ............ *G01B 11/26* (2013.01); *G01C 21/265* (2013.01); *G01C 21/28* (2013.01); *G06K 9/2036* (2013.01); *G06K 9/6201* (2013.01); *G06T 7/20* (2013.01); *G06T 7/70* (2017.01); *B60Q 2400/50* (2013.01); *G06T 2207/30252* (2013.01)

(56) References Cited

U.S. PATENT DOCUMENTS

| | | | |
|---|---|---|---|
| 2005/0163343 A1 | 7/2005 | Kakinami et al. | |
| 2012/0154785 A1* | 6/2012 | Gilliland | G01S 7/4813 356/5.01 |
| 2013/0182906 A1 | 7/2013 | Kojo et al. | |
| 2013/0297197 A1* | 11/2013 | Zhai | B60W 30/12 701/408 |
| 2015/0078624 A1* | 3/2015 | Fukuda | B60R 1/00 382/104 |
| 2015/0174981 A1* | 6/2015 | Buma | B60G 17/0165 701/38 |

FOREIGN PATENT DOCUMENTS

| | | |
|---|---|---|
| JP | 2004198212 A | 7/2004 |
| JP | 2007256090 A | 10/2007 |
| JP | 2008175717 A | 7/2008 |
| JP | 2010101683 A | 5/2010 |
| JP | 2013147114 A | 8/2013 |
| JP | 2013187862 A | 9/2013 |
| WO | 2007043036 A1 | 4/2007 |
| WO | 2012091814 A2 | 7/2012 |
| WO | 2012172870 A1 | 12/2012 |

OTHER PUBLICATIONS

R. I. Hartley, "A linear method for reconstruction from lines and points," Proc. 5th International Conference on computer Vision, Cambridge, Massachusetts, pp. 882-887 (1995).

D. G. Lowe, "Distinctive Image Features from Scale-Invariant Keypoints," Int. J. Comput. Vis., vol. 60, No. 2, pp. 91-110, Nov. 2004.

Yasushi Kanazawa, et al., "Detection of Feature Points for Computer Vision", IEICE Journal, Dec. 2004, pp. 1043-1048, vol. 87, No. 12.

* cited by examiner

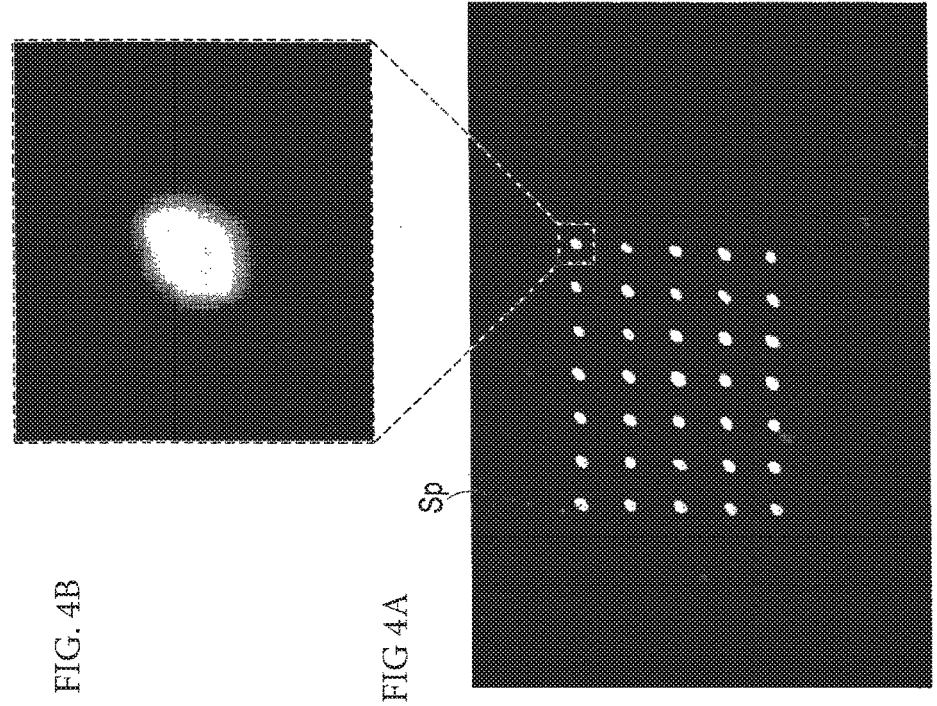
FIG. 4A
FIG. 4B
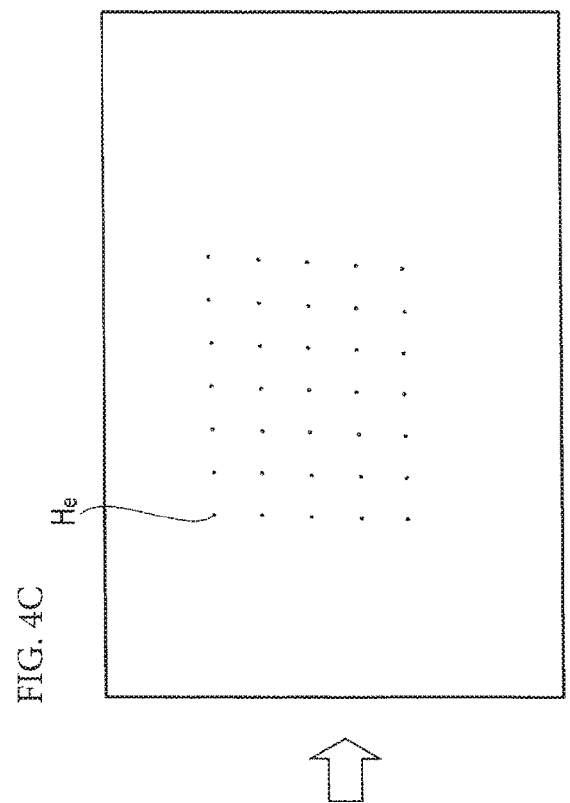
FIG. 4C

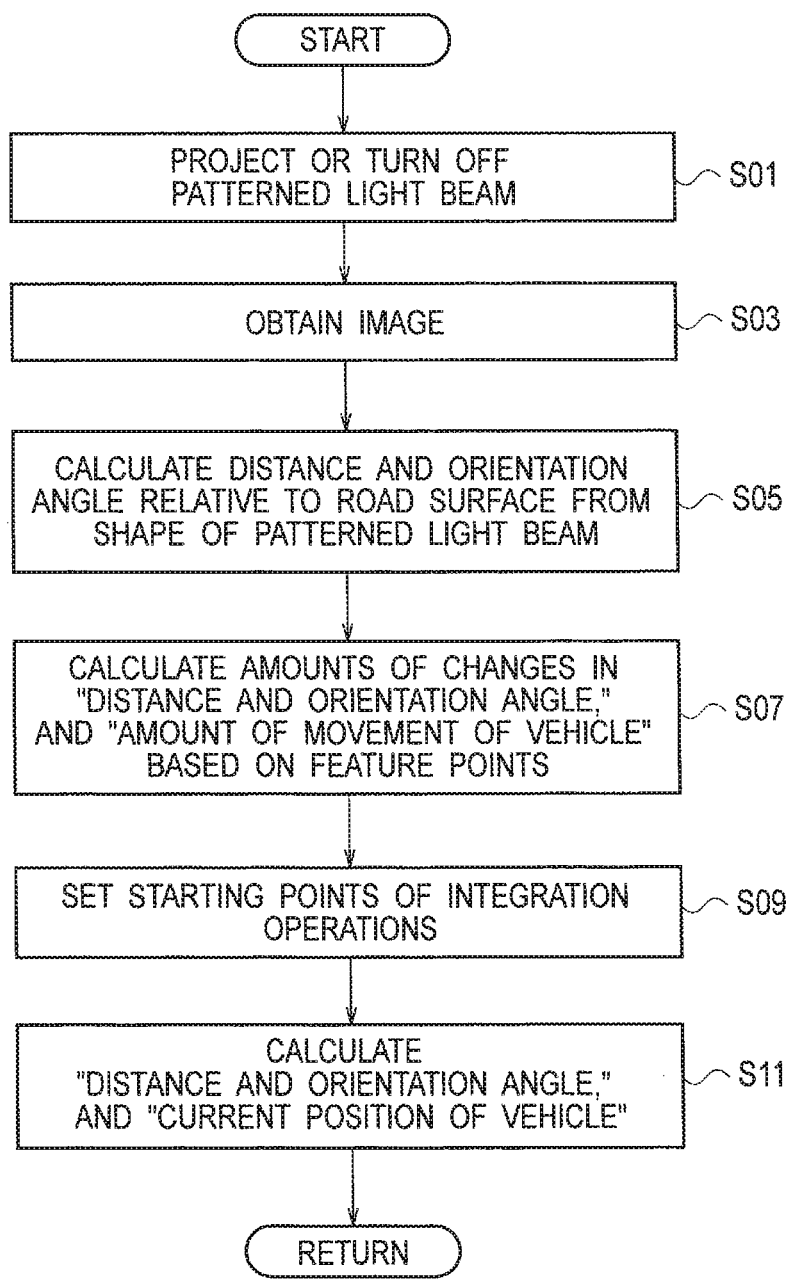

SELF-POSITION CALCULATING APPARATUS AND SELF-POSITION CALCULATING METHOD

TECHNICAL FIELD

The present invention relates to a self-position calculating apparatus and a self-position calculating method.

BACKGROUND

A technology has been known in which: cameras installed in a vehicle capture images of surroundings of the vehicle; and an amount of movement of the vehicle is obtained based on changes in the images (see Japanese Patent Application Publication No. 2008-175717). Japanese Patent Application Publication No. 2008-175717 aims at obtaining the amount of movement of the vehicle accurately even when the vehicle moves slightly at slow-speed. To this end, a feature point is detected from each image; the position of the feature point on the image is obtained; and thereby, the amount of movement of the vehicle is obtained from a direction and a distance of movement (amount of movement) of the feature point.

If, however, the feature point is detected under a bad condition, it is difficult to accurately obtain the amount of movement of the vehicle from the position of the feature point.

SUMMARY

The present invention has been made with the foregoing situation taken into consideration. An object of the present invention is to provide a self-position calculating apparatus and a self-position calculating method which are capable of accurately and stably estimating a current position of the vehicle regardless of the condition under which feature points are detected.

A self-position calculating apparatus according to an aspect of the present invention includes: a light projector configured to project a patterned light beam onto a road surface around a vehicle; and an image capturing unit configured to capture an image of the road surface around the vehicle including an area onto which the patterned light beam is projected. The self-position calculating apparatus calculates an orientation angle of the vehicle relative to the road surface from a position of the patterned light beam on the image obtained by the image capturing unit, and calculates an amount of change in the orientation of the vehicle based on temporal changes in multiple feature points on the road surface which are detected from the image. Furthermore, the self-position calculating apparatus calculates current position and orientation angle of the vehicle by adding the amount of change in the orientation to initial position and orientation angle of the vehicle. If a condition under which the multiple feature points are detected is too bad to satisfy a first criterion, the self-position calculating apparatus projects the patterned light beam.

BRIEF DESCRIPTION OF THE DRAWINGS

FIG. 3($b$) is a schematic diagram showing how a direction 34 of movement of the camera 12 is obtained from temporal changes in feature points detected from another area 33 which is different from an area onto which the patterned light beam 32$a$ is projected;

FIGS. 4($a$) and 4($b$) are diagrams each showing an image of the patterned light beam 32$a$ which is obtained by applying a binarization process to an image obtained by the camera 12, with FIG. 4($a$) being a diagram showing an image of the patterned light beam 32$a$ as a whole and FIG. 4($b$) being a magnified diagram showing an image of one spotlight $S_p$;

FIG. 4($c$) is a diagram showing a position $H_e$ of the center of gravity of each spotlight $S_p$ extracted by a patterned light beam extractor 21;

FIG. 6($b$) shows a second frame 38' obtained at time ($t+\Delta t$) until which time $\Delta t$ elapses from time t;

FIG. 7 is a flowchart showing an example of how a self-position calculating method is performed using the self-position calculating apparatus;

DETAILED DESCRIPTION OF THE EMBODIMENTS

Figure 1:
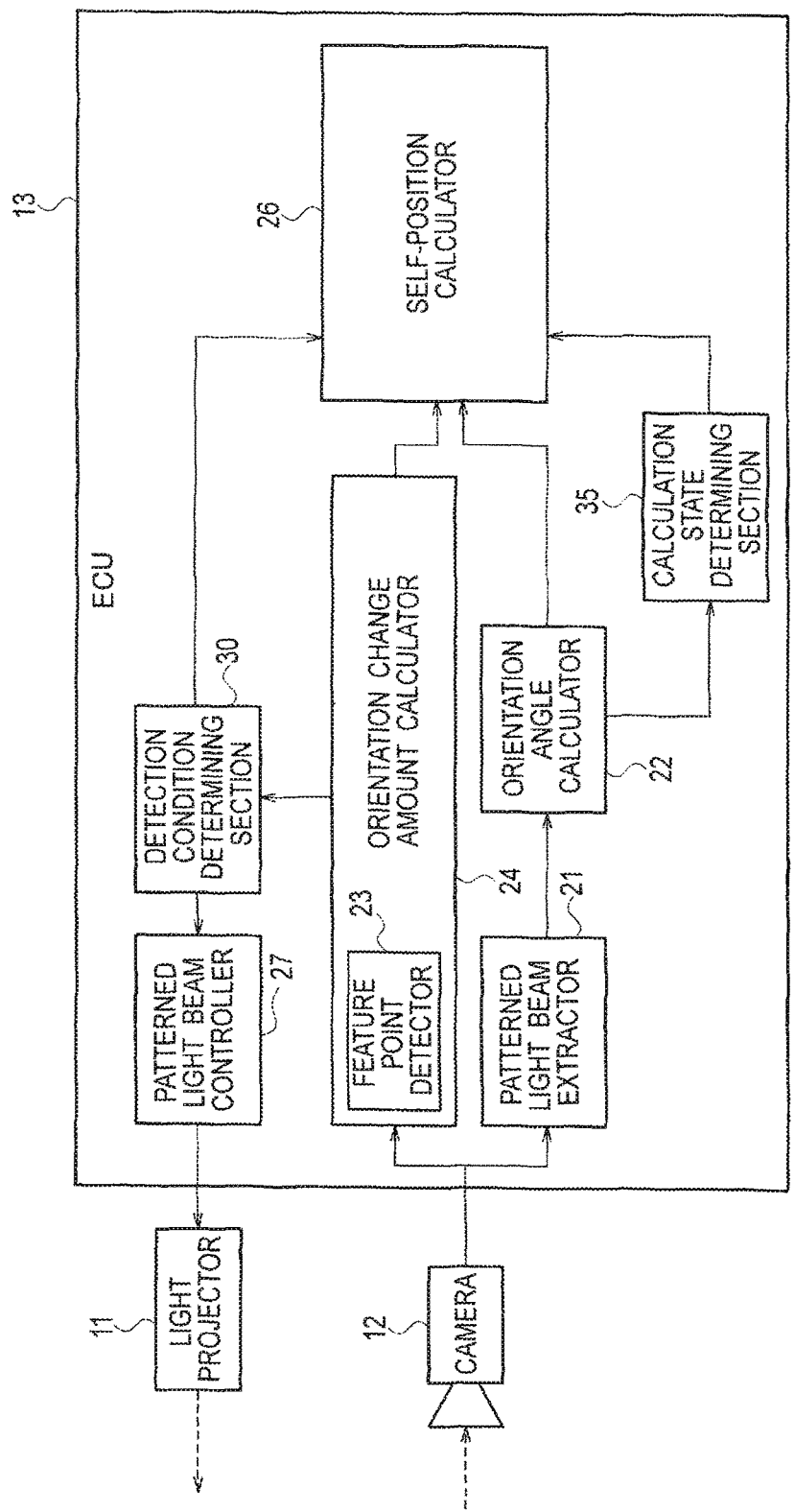
FIG. 1 is a block diagram showing an overall configuration of a self-position calculating apparatus of an embodiment.

Referring to the drawings, descriptions will be provided for embodiments. The same components across the drawings will be denoted by the same reference signs. Descriptions for such components will be omitted.

First Embodiment

[Hardware Configuration] To begin with, referring to FIG. 1, descriptions will be provided for a hardware configuration of a self-position calculating apparatus of a first embodiment. The self-position calculating apparatus includes a light projector 11, a camera 12 and an engine control unit (ECU) 13. The light projector 11 is installed in a vehicle, and projects a patterned light beam onto a road surface around the vehicle. The camera 12 is installed in the vehicle, and is an example of an image capturing unit configured to capture and thus obtain images of the road surface around the vehicle, inclusive of an area onto which the patterned light beam is projected. The ECU 13 is an example of a controller configured to control the light projector 11, and to perform a series of information process cycles for estimating an amount of movement of the vehicle from images obtained by the camera 12.

Figure 2:
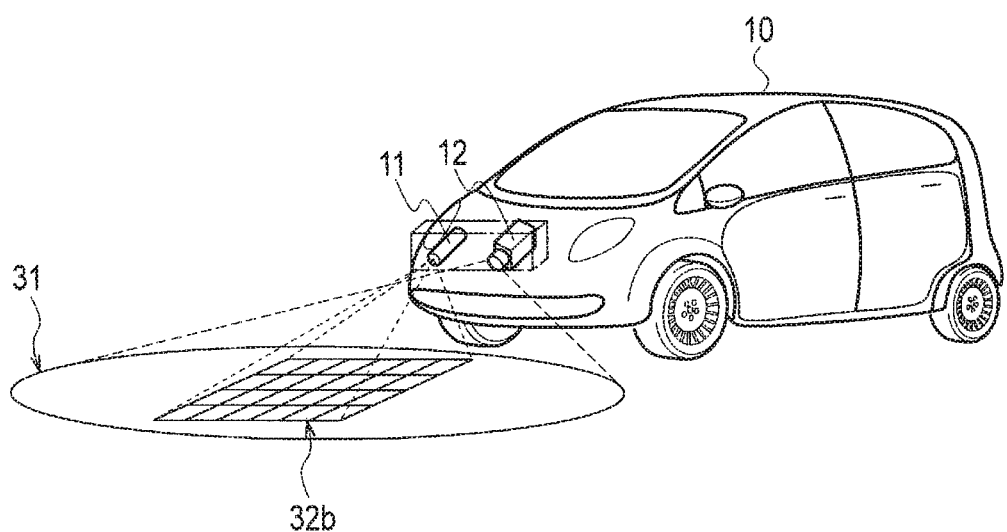
FIG. 2 is an external view showing an example of how a light projector 11 and a camera 12 are installed in a vehicle 10.

The camera 12 is a digital camera using a solid-state image sensor such as a CCD and a CMOS, and obtains processable digital images. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example.

The height at and direction in which to set the camera 12 are adjusted in a way that enables the camera 12 to capture images of feature points (textures) on the road surface 31 in front of the vehicle 10 and the patterned light beam 32b projected from the light projector 11. The focus and diaphragm of the lens of the camera 12 are automatically adjusted as well. The camera 12 repeatedly captures images at predetermined time intervals, and thereby obtains a series of image (frame) groups. Image data obtained by the camera 12 is transferred to the ECU 13, and is stored in a memory included in the ECU 13.

As shown in FIG. 2, the light projector 11 projects the patterned light beam 32b having a predetermined shape, inclusive of a square or rectangular lattice shape, onto the road surface 31 within an image capturing range of the camera 12. The camera 12 captures images of the patterned light beam projected onto the road surface 31. The light projector 11 includes a laser pointer and a diffraction grating, for example. The diffraction grating diffracts the laser beam projected from the pointer. Thereby, as shown in FIGS. 2 to 4, the light projector 11 generates the patterned light beam (32b, 32a) which includes multiple spotlights $S_p$ arranged in a lattice or matrix pattern. In examples shown in FIGS. 3 and 4, the light projector 11 generates the patterned light beam 32a including 5×7 spotlights $S_p$.

Returning to FIG. 1, the ECU 13 includes a CPU, a memory, and a microcontroller including an input-output section. By executing pre-installed computer programs, the ECU 13 forms multiple information processors which are provided with the self-position calculating apparatus. For each image (frame), the ECU 13 repeatedly performs the series of information process cycles for calculating the self-position of the vehicle from images obtained by the camera 12. The ECU 13 may be also used as an ECU for controlling other systems relating to the vehicle 10.

The multiple information processors include a patterned light beam extractor 21, an orientation angle calculator 22, an orientation change amount calculator 24, a self-position calculator 26, a patterned light beam controller 27, a detection condition determining section 30, and a calculation state determining section 35. The orientation change amount calculator 24 includes a feature point detector 23.

Figure 3A:
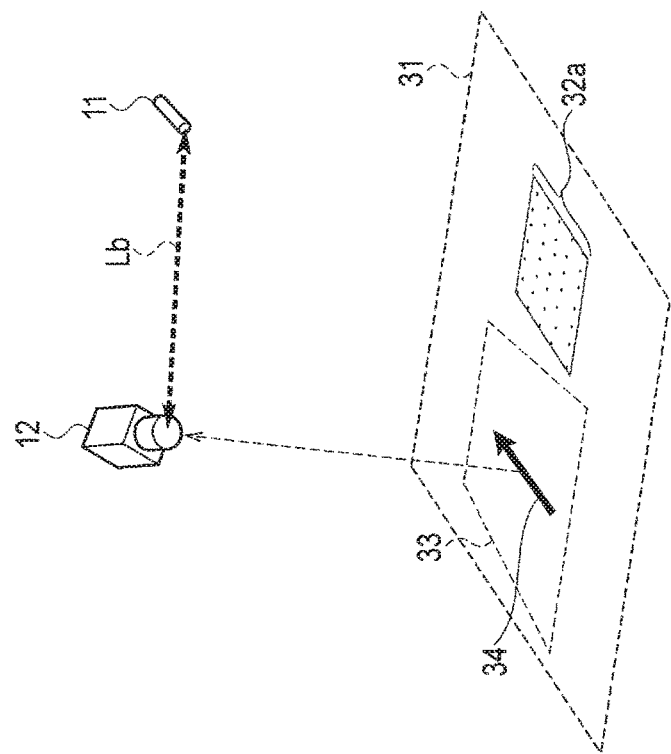
FIG. 3($a$) is a diagram showing how positions of places on a road surface 31 onto which spotlights are respectively projected are calculated from a base length Lb between the light projector 11 and the camera 12, as well as coordinates ($U_j$, $V_j$) of each spotlight.

The patterned light beam extractor 21 reads an image obtained by the camera 12 from the memory, and extracts the position of the patterned light beam from this image. For example, as shown in FIG. 3(a), the light projector 11 projects the patterned light beam 32a, which includes the multiple spotlights arranged in a matrix pattern, onto the road surface 31, while the camera 12 detects the patterned light beam 32a reflected off the road surface 31. The patterned light beam extractor 21 applies a binarization process to the image obtained by the camera 12, and thereby extracts only an image of the spotlights $S_p$, as shown in FIGS. 4(a) and 4(b). Thereafter, as shown in FIG. 4(c), the patterned light beam extractor 21 extracts the position of the patterned light beam 32a by calculating the center-of-gravity position $H_e$ of each spotlight $S_p$, that is to say, the coordinates $(U_j, V_j)$ of each spotlight $S_p$ on the image. The coordinates are expressed using the number assigned to a corresponding pixel in the image sensor of the camera 12. In a case where the patterned light beam includes 5×7 spotlights Sp, "j" is an integer not less than 1 but not greater than 35. The memory stores the coordinates $(U_j, V_j)$ of the spotlight $S_p$ on the image as data on the position of the patterned light beam 32a.

The orientation angle calculator 22 reads the data on the position of the patterned light beam 32a from the memory, and calculates the distance and orientation angle of the vehicle 10 relative to the road surface 31 from the position of the patterned light beam 32a on the image obtained by the camera 12. For example, as shown in FIG. 3(a), using the trigonometrical measurement principle, the orientation angle calculator 22 calculates the position of each spotlighted area on the road surface 31, as the position of the spotlighted area relative to the camera 12, from a base length Lb between the light projector 11 and the camera 12, as well as the coordinates $(U_j, V_j)$ of each spotlight on the image. Thereafter, the orientation angle calculator 22 calculates a plane equation of the road surface 31 onto which the patterned light beam 32a is projected, that is to say, the distance and orientation angle (normal vector) of the camera 12 relative to the road surface 31, from the position of each spotlight relative to the camera 12. It should be noted that in the embodiment, the distance and orientation angle of the camera 12 relative to the road surface 31 are calculated as an example of the distance and orientation angle of the vehicle 10 relative to the road surface 31 since the position of installation of the camera 12 in the vehicle 10 and the angle for the camera 12 to capture images are already known. Hereinafter, the distance and orientation angle of the camera 12 relative to the road surface 31 will be referred to as "distance and orientation angle." The distance and orientation angle calculated by the orientation angle calculator 22 are stored into the memory.

To put it specifically, since the camera 12 and the light projector 11 are fixed to the vehicle 10, the direction in which to project the patterned light beam 32a and the distance (the base length Lb) between the camera 12 and the light projector 11 are already known. For this reason, using the trigonometrical measurement principle, the orientation angle calculator 22 is capable of obtaining the position of each spotlighted area on the road surface 31, as the position $(X_j, Y_j, Z_j)$ of each spotlight relative to the camera 12, from the coordinates $(U_j, V_j)$ of each spotlight on the image.

It should be noted that, in many cases, the position $(X_j, Y_j, Z_j)$ of each spotlight relative to the camera 12 is not present on the same plane. This is because the relative position of each spotlight changes according to the unevenness of the asphalt of the road surface 31. For this reason, the method of least squares may be used to obtain a plane equation which makes the sum of squares of distance difference of each spotlight becomes least.

The feature point detector 23 reads the image obtained by the camera 12 from the memory, and detects feature points on the road surface 31 from the image read from the memory. In order to detect the feature points on the road surface 31, the feature point detector 23 may use a method described in "D. G. Lowe, "Distinctive Image Features from Scale-Invariant Keypoints," Int. J. Comput. Vis., vol. 60, no. 2, pp. 91-110, November 200." Otherwise, the feature point detector 23 may use a method described in "Kanazawa Yasushi, Kanatani Kenichi, "Detection of Feature Points for Computer Vision," IEICE Journal, vol. 87, no. 12, pp. 1043-1048, December 2004."

Figure 6A:
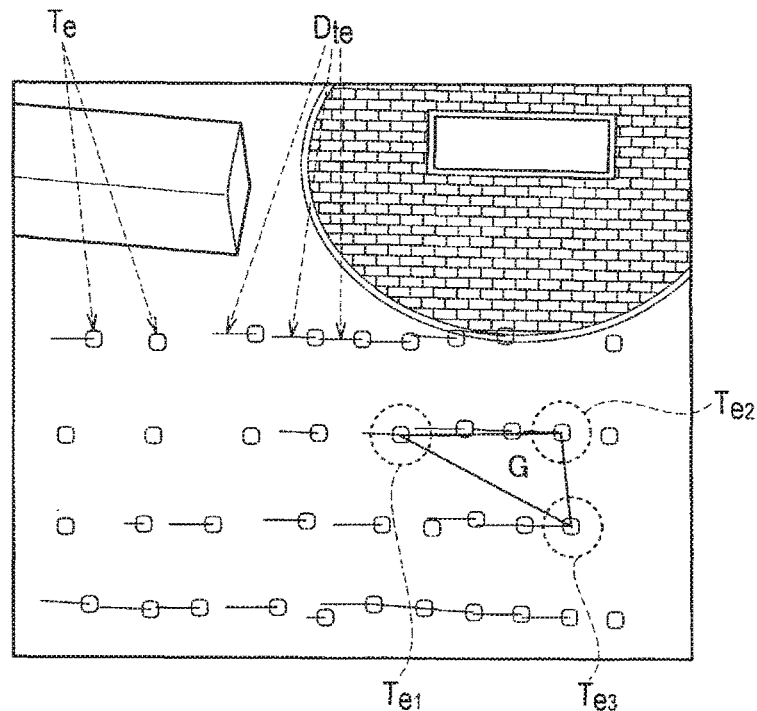
FIG. 6($a$) shows an example of a first frame (image) 38 obtained at time t.
Figure 6B:
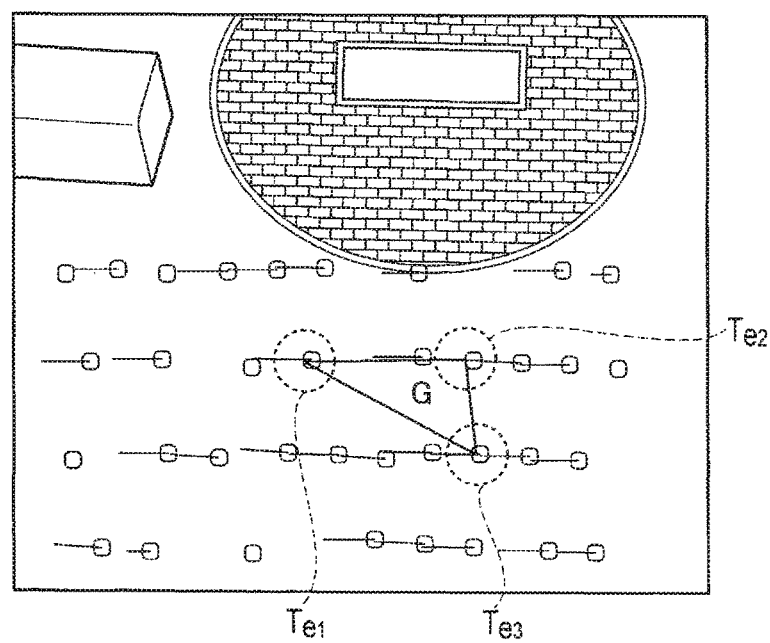

To put it specifically, for example, the feature point detector 23 uses the Harris operator or the SUSAN operator as that points, such as apexes of an object, the luminance values of which are largely different from those of the vicinities of the points are detected as the feature points. Instead, however, the feature point detector 23 may use a SIFT (Scale-Invariant Feature Transform) feature amount so that points around which the luminance values change with certain regularity are detected as the feature points. After detecting the feature points, the feature point detector 23 counts the total number N of feature points detected from one image, and assigns identification numbers (i (1≤i≤N)) to the respective feature points. The position $(U_i, V_i)$ of each feature point on the image are stored in the memory inside the ECU 13. FIGS. 6(a) and 6(b) each shows examples of the feature points $T_e$ which are detected from the image obtained by the camera 12. The positions $(U_i, V_i)$ of the respective feature points on the image are stored in the memory.

It should be noted that the embodiment treats particles of asphalt mixture with a particle size of not less than 1 cm but not greater than 2 cm as the feature points on the road surface 31. The camera 12 employs the VGA resolution mode (approximate 300 thousand pixels) in order to detect the feature points. In addition, the distance from the camera 12 to the road surface 31 is approximately 70 cm. Moreover, the direction in which the camera 12 captures images is tilted at approximately 45 degrees to the road surface 31 from the horizontal plane. What is more, the luminance value of each image obtained by the camera 12 and thereafter sent to the ECU 13 is within a range of 0 to 255 (0: darkest, 255: brightest).

The orientation change amount calculator 24 reads, from the memory, the positions $(U_i, V_i)$ of the respective multiple feature points on an image included in a previous frame which is among the flames captured during each certain information process cycle. Furthermore, the orientation change amount calculator 24 reads, from the memory, the positions $(U_i, V_i)$ of the respective multiple feature points on an image included in a current frame. Thereafter, based on changes in the positions of the multiple feature points on the images, the orientation change amount calculator 24 obtains an amount of change in the orientation of the vehicle. In this respect, the "amount of change in the orientation of the vehicle" includes both amounts of changes in "the distance and orientation angle" of the vehicle relative to the road surface 31 and an "amount of movement of the vehicle (the camera 12)" on the road surface. Descriptions will be hereinbelow provided for how to calculate the amounts of changes in the distance and orientation angle and the amount of movement of the vehicle.

Figure 5:
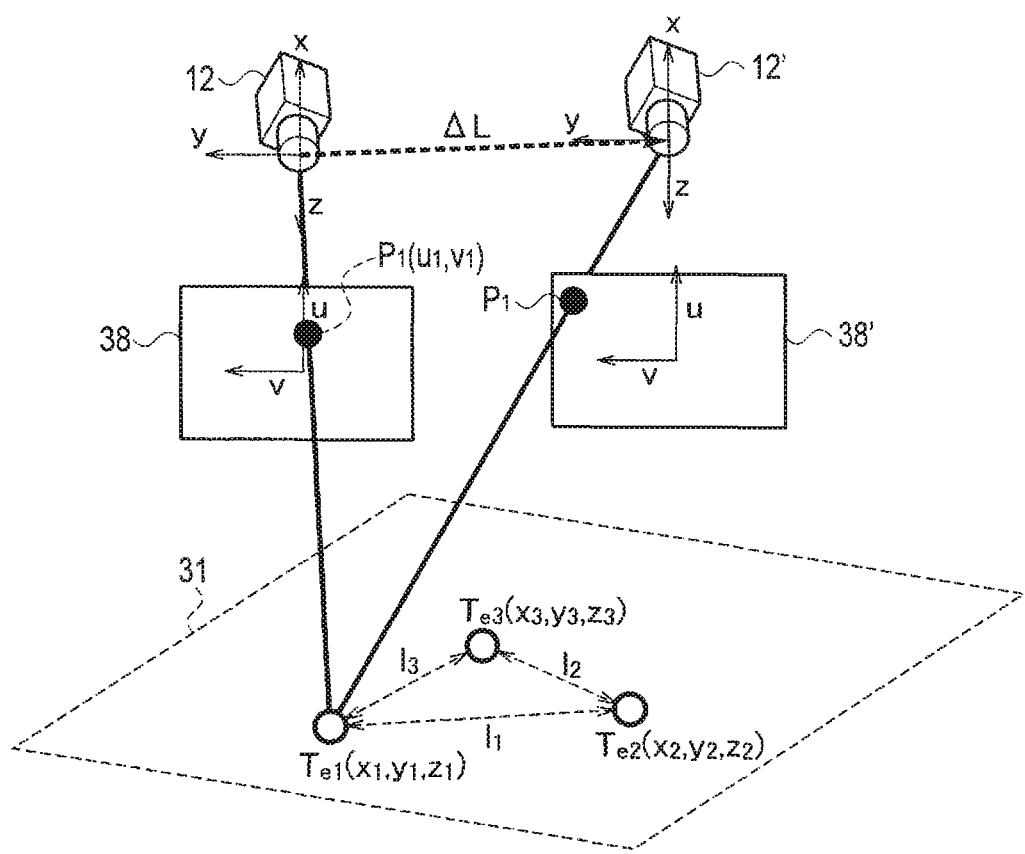
FIG. 5 is a schematic diagram for explaining how to calculate amounts of changes in distance and orientation angle, as well as an amount ($\Delta L$) of movement of the camera 12.

FIG. 6(a) shows an example of a first frame (image) 38 obtained at time t. Let us assume a case where as shown in FIG. 5 or 6(a), a relative position $(X_i, Y_i, Z_i)$ of each of three feature points $T_{e1}, T_{e2}, T_{e3}$ are calculated on the first frame 38, for example. In this case, a plane G identified by the feature points $T_{e1}, T_{e2}, T_{e3}$ can be regarded as the road surface. Accordingly, the orientation change amount calculator 24 is capable of obtaining the distance and orientation angle (normal vector) of the camera 12 relative to the road surface (the plane G), from the relative position $(X_i, Y_i, Z_i)$. Furthermore, from an already-known camera model, the orientation change amount calculator 24 is capable of obtaining a distance l between the feature points $T_{e1}, T_{e2}$, a distance $l_2$ between the feature points $T_{e2}, T_{e3}$ and a distance $l_3$ between the feature points $T_{e3}, T_{e1}$, as well as an angle between a straight line joining the feature points $T_{e1}, T_{e2}$ and a straight line joining the feature points $T_{e2}, T_{e3}$, an angle between the straight line joining the feature points $T_{e2}, T_{e3}$ and a straight line joining the feature points $T_{e3}, T_{e1}$, and an angle between the straight line joining the feature points $T_{e3}, T_1$ and the straight line joining the feature points $T_{e1}, T_{e2}$. The camera 12 in FIG. 5 shows where the camera is located when camera is for the first frame.

It should be noted that the three-dimensional coordinates $(X_i, Y_i, Z_i)$ of the relative position relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(b) shows a second frame obtained at time (t+Δt) where the time length Δt passed from time t. A camera 12' in FIG. 5 shows where the camera is located when camera captures the second frame 38'. As shown in FIG. 5 or 6(b), the camera 12' captures an image including the feature points $T_{e1}, T_{e2}, T_{e3}$ as the second frame 38', and the feature point detector 23 detects the feature points $T_{e1}, T_{e2}, T_{e3}$ from the image. In this case, the orientation change amount calculator 24 is capable of calculating not only an amount ΔL of movement of the camera 12 (the vehicle) in the interval of time Δt but also an amounts of changes in the distance and the orientation angle of the camera 12 (the vehicle) in the interval of time Δt from: the relative position $(X_i, Y_i, Z_i)$ of each of the feature points $T_{e1}$, $T_{e2}$, $T_{e3}$ at time t; a position $P_1(U_i, V_i)$ of each feature point on the second frame 38'; and the camera model of the camera 12. For example, the orientation change amount calculator 24 is capable of calculating the amount (ΔL) of movement of the camera 12 and the amounts of changes in the distance and orientation angle of the camera 12 by solving the following system of simultaneous equations (1) to (4). Incidentally, the equation (1) is based on an ideal pinhole camera free from strain and optical axial misalignment which is modeled after the camera 12, where λi and f denote a constant and a focal length. The parameters of the camera model may be calibrated in advance.

[Equation 1]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation 2]

$$(x_1 - x_2)^2 + (y_1 - y_2)^2 + (z_1 - z_2)^2 = l_1^2 \quad (2)$$

[Equation 3]

$$(x_3 - x_2)^2 + (y_3 - y_2)^2 + (z_3 - z_2)^2 = l_2^2 \quad (3)$$

[Equation 4]

$$(x_1 - x_3)^2 + (y_1 - y_3)^2 + (z_1 - z_3)^2 = l_3^2 \quad (4)$$

Figure 3B:
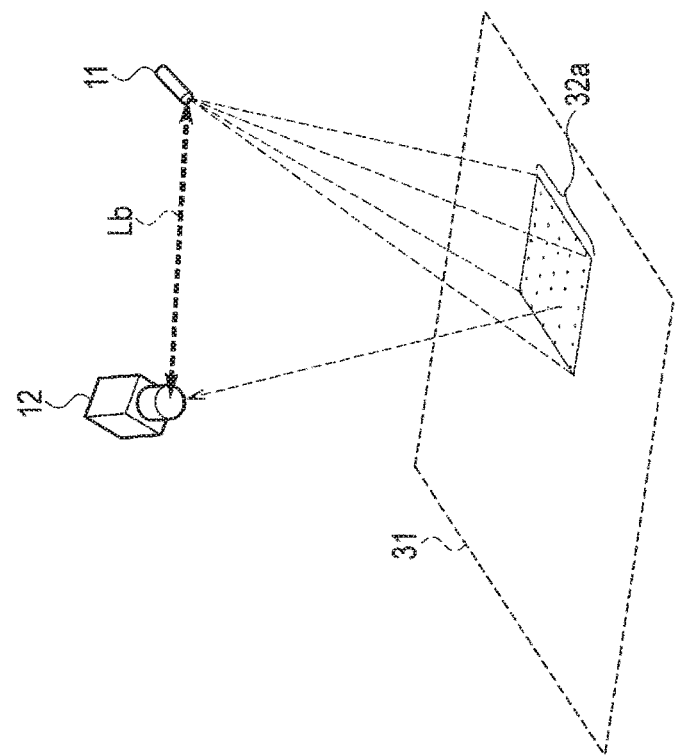

FIG. 3(b) schematically shows how a direction 34 of movement of the camera 12 is obtained from temporal changes in feature points detected from another area 33 within the image capturing range of the camera 12, which is different from the area onto which the patterned light beam 32a is projected. Furthermore, FIGS. 6(a) and 6(b) each show an example of an image in which each vector $D_{te}$ represents a direction and an amount of change in the position of its corresponding feature point $T_e$. The orientation change amount calculator 24 is capable of calculating not only the amount (ΔL) of movement of the camera 12 for the time length Δt, but also the amounts of changes in the distance and orientation angle for the time length Δt, simultaneously. For this reason, with the amounts of changes in the distance and orientation angle taken into consideration, the orientation change amount calculator 24 is capable of accurately calculating the amount (ΔL) of movement in six degrees of freedom. In other words, an error in estimating the amount (ΔL) of movement can be minimized even when the distance and orientation angle are changed by the roll or pitch due to the turn, acceleration or deceleration of the vehicle 10.

It should be noted that instead of using all the feature points whose relative positions are calculated, the orientation change amount calculator 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Mass., pp. 882-887 (1995)).

The associating of the feature points in the current frame with the feature points in the previous frame may be achieved, for example, by: storing an image of a small area around each detected feature point into the memory; and for each feature point, making a determination from a similarity in luminance information and a similarity in color information. To put it specifically, the ECU 13 stores a 5(horizontal)×5(vertical)-pixel image around each detected feature point into the memory. If for example, the difference in the luminance information among 20 or more pixels is equal to or less than 1%, the orientation change amount calculator 24 determines that the feature point in question is associated between the current and previous frames.

If like in this case, the feature points $T_{e1}$, $T_{e2}$, $T_{e3}$ whose relative positions $(X_i, Y_i, Z_i)$ are calculated are detected from the frame image 38' obtained at the ensuing timing as well, the orientation change amount calculator 24 is capable of calculating the "amount of change in the orientation of the vehicle" from the temporal changes in the multiple feature points on the road surface.

The self-position calculator 26 calculates the distance and orientation angle from the "amounts of changes in the distance and orientation angle" calculated by the orientation change amount calculator 24. In addition, the self-position calculator 26 calculates the current position of the vehicle from the "amount of movement of the vehicle" calculated by the orientation change amount calculator 24.

To put it specifically, in a case where the distance and orientation angle calculated by the orientation angle calculator 22 (see FIG. 1) are set as the starting points, the self-position calculator 26 updates the distance and orientation angle with the most recent numerical values by sequentially adding (performing an integration operation on) the amounts of changes in the distance and orientation angle calculated for each frame by the orientation change amount calculator 24 to the starting points (the distance and orientation angle). In addition, the self-position calculator 26 calculates the current position of the vehicle by: setting the starting point (the initial position of the vehicle) at the position of the vehicle obtained when the orientation angle calculator 22 calculates the distance and orientation angle; and sequentially adding (performing an integration operation on) the amount of movement of the vehicle to the thus-set initial position thereof. For example, if the starting point (the initial position of the vehicle) is set to be matched to the position of the vehicle on a map, the self-position calculator 26 is capable of sequentially calculating the current position of the vehicle on the map.

To put it specifically, if three or more feature points each corresponding between the previous and current frames can be detected continuously from the two frames, the continuation of the process (integration operation) of adding the amounts of changes in the distance and orientation angle makes it possible to continuously update the distance and orientation angle without using the patterned light beam 32a. Nevertheless, the distance and orientation angle calculated using the patterned light beam 32a, or a predetermined initial distance and orientation angle, may be used for the first information process cycle. In other words, the distance and orientation angle which are starting points of the integration operation may be calculated using the patterned light beam 32a, or may be set at predetermined initial values. It is desirable that the predetermined initial distance and the predetermined initial orientation angle are a distance and an orientation angle determined with at least the occupants and payload of the vehicle 10 taken into consideration. For example, the distance and orientation angle calculated using the patterned light beam 32a which is projected while the ignition switch of the vehicle 10 is on and when the shift position is moved from the parking position to another position may be used as the predetermined initial distance and the predetermined initial orientation angle. Thereby, it is possible to obtain the distance and orientation angle which is not affected by the roll or pitch of the vehicle 10 due to a turn, acceleration or deceleration of the vehicle 10.

The embodiment is configured such that: the amounts of changes in the distance and orientation angle are repeatedly calculated, and are each time added thereto; and thereby, the amounts of changes in the distance and orientation angle are updated with the most recent numerical values. Instead, however, the embodiment may be configured such that: only the amount of change in the orientation angle of the camera 12 relative to the road surface 31 is repeatedly calculated, and are each time updated. In this case, it may be supposed that the distance between the road surface 31 and the camera 12 remains constant. This makes it possible to reduce the operation load on the ECU 13 while minimizing the error in estimating the amount (ΔL) of movement with the amount of change in the orientation angle taken into consideration, and to increase the operation speed of the ECU 13.

The detection condition determining section 30 determines whether or not a condition under which the feature point detector 23 detects the feature points $T_e$ is too bad to satisfy a first criterion. For example, if like a concrete pavement inside a tunnel, the road surface is less patterned and uneven with particles of asphalt mixture, the feature points detectable from an image of the road surface decreases in number. The decreased number of detectable feature points makes it difficult to continuously detect the feature points which are associated between the previous and current frames, and lowers the accuracy with which the distance and orientation angle are updated.

As a measure against this problem, the detection condition determining section 30 determines that the condition under which the feature point detector 23 detects the feature points $T_e$ is too bad to satisfy the first criterion, if for example, the number of feature points, whose positions relative to the camera 12 are calculated and can be detected from an image obtained in the subsequent information process cycle, is less than a predetermined threshold value (four, for example). In other words, if four or more feature points associated between the previous and current frames cannot be detected, the detection condition determining section 30 determines that the condition under which the feature points $T_e$ are detected is too bad to satisfy the first criterion. Incidentally, as shown in FIG. 6, at least three feature points associated between the previous and current frames are needed to obtain the amounts of changes in the distance and orientation angle. This is because three feature points are needed to define the plane G. Since more feature points are needed to increase the estimation accuracy, it is desirable that the predetermined threshold value be at four, five or more.

Based on the result of the determination made by the detection condition determining section 30, the patterned light beam controller 27 controls how the light projector 11 projects the patterned light beam 32a. If the detection condition determining section 30 determines that the condition under which the multiple feature points are detected is good enough to satisfy the first criterion, the patterned light beam controller 27 turns off the patterned light beam 32a. On the other hand, if the detection condition determining section 30 determines that the condition under which the multiple feature points are detected is too bad to satisfy the first criterion, the patterned light beam controller 27 projects the patterned light beam 32a. To put it specifically, based on the result of the determination made by the detection condition determining section 30, the patterned light beam controller 27 switches on and off a patterned light beam projection flag, and sends the patterned light beam projection flag to the light projector 11. Based on the patterned light beam projection flag, the light projector 11 projects or turns off the patterned light beam 32a in the next information process cycle.

Furthermore, the detection condition determining section 30 determines whether or not the condition under which the feature point detector 23 detects the feature points $T_e$ is too bad to satisfy a second criterion which is lower than the first criterion. For example, if three or more feature points associated between the previous and current frames cannot be detected, the detection condition determining section 30 determines that the condition under which the feature points $T_e$ are detected is too bad to satisfy the second criterion.

If the detection condition determining section 30 determines that the condition under which the multiple feature points are detected is good enough to satisfy the second criterion, the orientation angle calculator 22 calculates no distance or orientation angle from the position of the patterned light beam 32a. On the other hand, if the detection condition determining section 30 determines that the condition under which the multiple feature points are detected is too bad to satisfy the second criterion, the orientation angle calculator 22 calculates the distance and orientation angle from the position of the patterned light beam 32a, since the plane G cannot be defined from the feature points $T_e$.

If the detection condition determining section 30 determines that the condition under which the multiple feature points are detected satisfies the second criterion, the self-position calculator 26 retains the starting points of the integration operations as they are. On the other hand, if the detection condition determining section 30 determines that the condition under which the multiple feature points are detected is too bad to satisfy the second criterion, the self-position calculator 26 resets the starting points of the integration operations (the orientation angle and the initial position of the vehicle) at the distance and orientation angle calculated by the orientation angle calculator 22 (see FIG. 1), and the position of the vehicle obtained at the time of the calculation, in the same information process cycle. Thereafter, the self-position calculator 26 starts to add the amount of change in the orientation of the vehicle to the thus-reset starting points.

It should be noted that in the first embodiment, based on the number of feature points associated between the previous and current frames, the detection condition determining section 30 determines under what condition the multiple feature points are detected. Instead, however, the detection condition determining section 30 may be configured such that, based on the total number N of feature points detected from one image, the detection condition determining section 30 determines under what condition the multiple feature points are detected. To put it specifically, the configuration may be such that if the total number N of feature points detected from one image is equal to or less than a predetermined threshold value (9, for example), the detection condition determining section 30 determines that the condition under which the multiple feature points are detected is bad. A numerical value (12) three times the predetermined threshold value (4) may be set as such a threshold value because there is likelihood that some of detected feature points are not associated between the previous and current frames.

The calculation state determining section 35 determines whether or not a state of calculation of the distance and orientation angle by the orientation angle calculator 22 is too bad to satisfy a third criterion. For example, in a case where the patterned light beam is projected onto a bump on the road surface 31, the accuracy of the calculation of the distance and orientation angle decreases significantly because the bump on the road surface 31 is larger than dents and projections of the asphalt pavement. If the condition under which the multiple feature points are detected is too bad to satisfy the second criterion, and concurrently if the state of the calculation of the distance and orientation angle is too bad to satisfy the third criterion, there would otherwise be no means for accurately detecting the distance and orientation angle, as well as the amounts of changes in the distance and orientation angle.

With this taken into consideration, the calculation state determining section 35 determines that the state of the calculation of the distance and orientation angle by the orientation angle calculator 22 is too bad to satisfy the third criterion, if standard deviations of the distance and orientation angle calculated by the orientation angle calculator 22 are greater than predetermined threshold values. Furthermore, if the number of spotlights detected out of the 35 spotlights is less than three, the calculation state determining section 35 determines that the state of the calculation of the distance and orientation angle by the orientation angle calculator 22 is too bad to satisfy the third criterion, since theoretically, the plane equation of the road surface 31 cannot be obtained. In a case where the plane equation is obtained using the method of least square, if an absolute value of a maximum value among the differences between the spotlights and the plane obtained by the plane equation is equal to or greater than a certain threshold value (0.05 m, for example), the calculation state determining section 35 may determine that the state of the calculation of the distance and orientation angle by the orientation angle calculator 22 is too bad to satisfy the third criterion.

If the detection condition determining section 30 determines that the condition under which the multiple feature points are detected is too bad to satisfy the second criterion, and concurrently if the calculation state determining section 35 determines that the state of the calculation of the distance and orientation angle by the orientation angle calculator 22 is too bad to satisfy the third criterion, the self-position calculator 26 uses the distance and orientation angle obtained in the previous information process cycle, as well as the current position of the vehicle, as the starting points of the integration operations. This makes it possible to minimize an error in calculating the amount of movement of the vehicle.

(Information Process Cycle)

Next, as an example of a self-position calculating method of estimating the amount of movement of the vehicle 10 from the image 38 obtained by the camera 12, the information process cycle to be repeatedly performed by the ECU 13 will be described referring to FIG. 7. The information process cycle shown in a flowchart of FIG. 7 is started at the same time as the self-position calculating apparatus becomes activated after the ignition switch of the vehicle 10 is turned on, and is repeatedly performed until the self-position calculating apparatus stops its operation.

In step S01 in FIG. 7, the light projector 11 projects or turns off the patterned light beam 32$a$. To put it specifically, based on whether the patterned light beam projection flag sent from the patterned light beam controller 27 in step S05 in the previous information process cycle is ON or OFF, the light projector 11 is switched between the projecting and the turning off of the patterned light beam 32$a$. The patterned light beam projection flag will be later described referring to FIG. 8.

Proceeding to step S03, the ECU 13 controls the camera 12 to obtain the image 38 by making the camera 12 shoot the road surface 31 around the vehicle 10, inclusive of an area onto which the patterned light beam 32$a$ is projected. The ECU 13 stores the data on the image obtained by the camera 12 into the memory.

It should be noted that the ECU 13 is capable of automatically controlling the diaphragm of the camera 12. The ECU 13 may be configured to perform a feedback control of the diaphragm of the camera 12 in a way that makes a value of brightness of the next image becomes equal to a median value between the maximum and minimum values in accordance with of an average of the brightness of the image 38 obtained in the previous information process cycle. Otherwise, since the value of the brightness of the area onto which the patterned light beam 32$a$ is projected, the ECU 13 may obtain an average value of the brightness of the previously-obtained image 38 from an area outside a part from which the patterned light beam 32$a$ is extracted.

Proceeding to step S05, the detection condition determining section 30 determines under what condition the multiple feature points are detected. Based on the result of the determination made by the detection condition determining section 30, the patterned light beam controller 27 switches the patterned light beam projection flag, and sends the resultant flag to the light projector 11. Meanwhile, based on the result of the determination made by the detection condition determining section 30, the orientation angle calculator 22 calculates or does not calculate the distance and orientation angle. Details of step S05 will be later described referring to FIGS. 8 and 9.

Proceeding to step S07, the ECU 13 detects the feature points from the image 38, extracts the feature points each corresponding between the previous and current information process cycles from the detected feature points, and calculates the amounts of changes in the distance and orientation angle, and the amount of movement of the vehicle from the positions ($U_i$, $V_i$) of the respective extracted feature points on the image.

To put it specifically, to begin with, the feature point detector 23 reads the image 38 obtained by the camera 12 from the memory, detects the feature points on the road surface 31 from the image 38, and stores the positions ($U_i$, $V_i$) of the respective feature points on the image into the memory. The orientation change amount calculator 24 reads the positions ($U_i$, $V_i$) of the respective feature points on the image from the memory, and calculates the positions ($X_i$, $Y_i$, $Z_i$) of the respective feature points relative to the camera 12 from the distance and orientation angle, as well as the positions ($U_i$, $V_i$) of the respective feature points on the image. Incidentally, the orientation change amount calculator 24 uses the starting points (the distance and orientation angle) which are set in step S09 in the previous information process cycle. Thereafter, the orientation change amount calculator 24 stores the positions ($X_i$, $Y_i$, $Z_i$) of the respective feature points relative to the camera 12 into the memory.

Then, the orientation change amount calculator 24 reads the positions ($U_i$, $V_i$) of the respective feature points on the image, and the relative positions ($X_i$, $Y_i$, $Z_i$) of the respective feature points calculated in step S07 in the previous information process cycle from the memory. The orientation change amount calculator 24 calculates the amounts of changes in the distance and orientation angle using: the relative positions ($X_i$, $Y_i$, $Z_i$) of the respective feature points each corresponding between the previous and current information process cycles; and the positions ($U_i$, $V_i$) of the respective thus-corresponding feature points on the image. Furthermore, the orientation change amount calculator 24 calculates the amount of movement of the vehicle from the previous relative positions ($X_i$, $Y_i$, $Z_i$) of the respective feature points in the previous information process cycle and the current relative positions ($X_i$, $Y_i$, $Z_i$) of the respective feature points in the current information process cycle. The "amounts of changes in the distance and orientation angle" and the "amount of movement of the vehicle" which are calculated in step S07 are used for the process in step S11.

Proceeding to step S09, the ECU 13 sets the starting points of the integration operations depending on: the condition under which the multiple feature points are detected; and the state of the calculation of the distance and orientation angle from the patterned light beam. Details will be later described referring to FIG. 10.

Proceeding to step S11, the self-position calculator 26 calculates the distance and orientation angle, as well as the current position of the vehicle from: the starting points of the integration operations set in the process in step S09; and the "amounts of changes in the distance and orientation angle" and the "amount of movement of the vehicle" calculated in the process in step S07.

Thus, the self-position calculating apparatus of the embodiment is capable of calculating the current position of the vehicle 10 by repeatedly performing the foregoing series of information process cycles to integrate the amount of movement of the vehicle 10.

Figure 8:
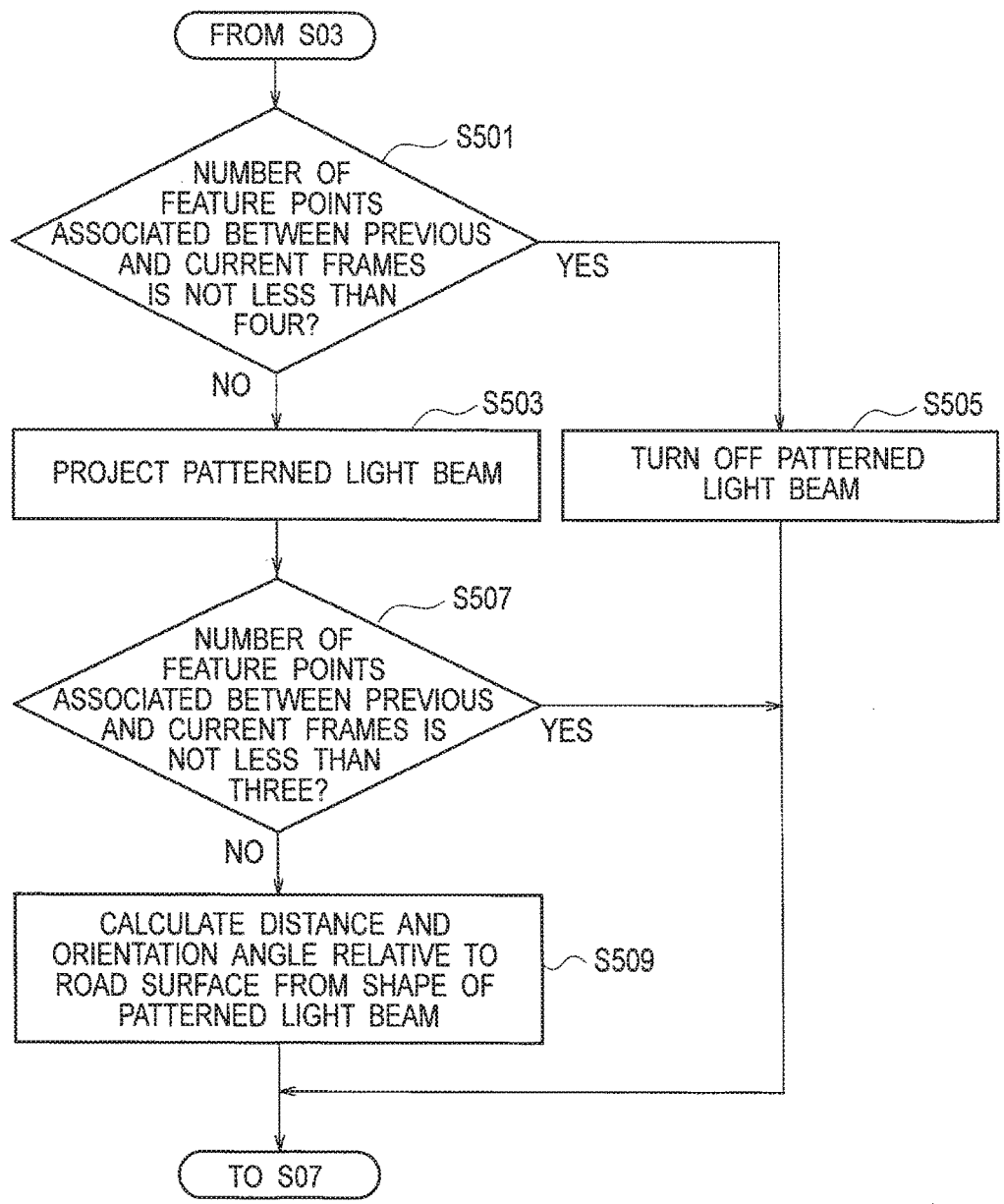
FIG. 8 is a flowchart showing a detailed procedure for step S05 shown in FIG. 7.

Referring to a flowchart in FIG. 8, descriptions will be provided for a detailed procedure in step S05 in FIG. 7. First of all, in step S501, the detection condition determining section 30 determines whether or not four or more feature points associated between the previous and current frames are detected. If four or more feature points are detected (if YES in step S501), the amounts of changes in the distance and orientation angle can be calculated from the temporal changes in the feature points. For this reason, the procedure proceeds to step S505, in which the patterned light beam controller 27 sets the patterned light beam projection flag OFF and sends the OFF flag to the light projector 11. Thereafter, the procedure proceeds to step S07 in FIG. 7 without calculating the distance or orientation angle from the position of the patterned light beam 32a.

On the other hand, if four or more feature points are not detected (if NO in step S501), the condition under which the multiple feature points are detected can be determined as being too bad to the first criterion. For this reason, the procedure proceeds to step S503, in which the patterned light beam controller 27 sets the patterned light beam projection flag ON and sends the ON flag to the light projector 11. Thereafter, the procedure proceeds to step S507.

In step S507, the detection condition determining section 30 determines whether or not three or more feature points associated between the previous and current frames are detected. If three or more feature points are detected (if YES in step S507), the amounts of changes in the distance and orientation angle can be calculated from the temporal changes in the feature points. For this reason, the procedure proceeds to step S07 in FIG. 7 without calculating the distance or orientation angle from the position of the patterned light beam 32a.

On the other hand, if three or more feature points are not detected (if NO in step S507), the amounts of changes in the distance and orientation angle cannot be calculated from the temporal changes in the feature points. For this reason, the procedure proceeds to step S509, in which the orientation angle calculator 22 calculates the distance and orientation angle from the temporal changes in the feature points. Thereafter, the procedure proceeds to step S07 in FIG. 7.

In step S509, to begin with, the patterned light beam extractor 21 reads the image 38 obtained by the camera 12 from the memory, and extracts the position of the patterned light beam 32a from the image 38, as shown in FIG. 4(c). The patterned light beam extractor 21 stores the coordinates ($U_j$, $V_j$) of each spotlight $S_p$ on the image, which are calculated as the data on the position of the patterned light beam 32a, into the memory.

The orientation angle calculator 22 reads the data on the position of the patterned light beam 32a from the memory, calculates the distance and orientation angle from the position of the patterned light beam 32a, and stores the thus-calculated distance and orientation angle into the memory.

Figure 9:
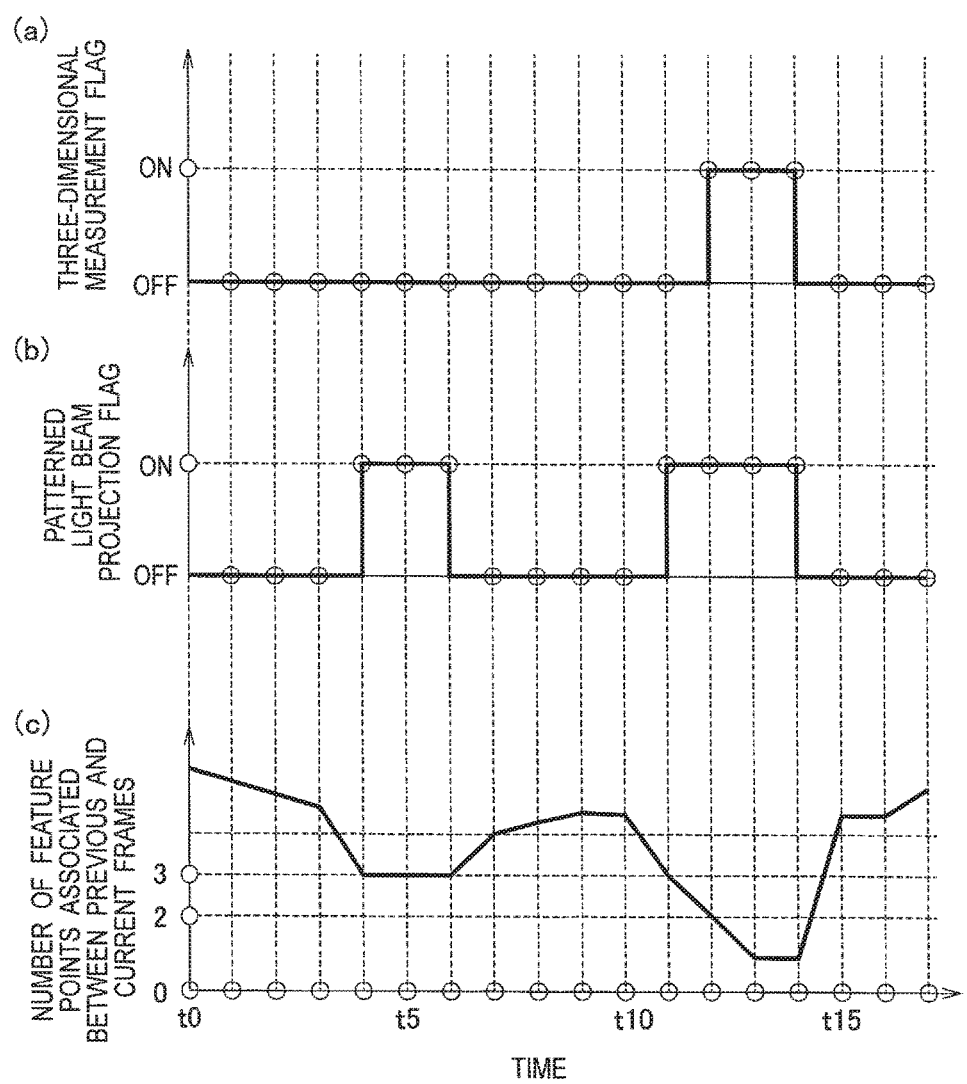
FIGS. 9($a$)-9($c$) are graphs showing an example of an information process to be performed in accordance with the flowchart shown in FIG. 8, with FIG. 9($a$) showing whether or not an orientation angle calculator 22 calculates the distance and orientation angle from the patterned light beam 32$a$, FIG. 9($b$) showing which state a patterned light beam projection flag is in, and FIG. 9($c$) showing how many feature points are associated between previous and current frames.

Referring to FIG. 9, descriptions will be provided for an example of the information process to be performed in accordance with the flowchart in FIG. 8. FIG. 9(a) shows whether or not the orientation angle calculator 22 calculates the distance and orientation angle from the patterned light beam 32a. FIG. 9(b) shows which condition the patterned light beam projection flag is in. FIG. 9(c) shows how many feature points are associated between the previous and current frames. In FIGS. 9(a) to 9(c), the horizontal axis represents how much time elapses, while t0, t1, t2, . . . respectively represent the information process cycles (hereinafter referred to as "cycles").

During cycles t0 to t3, the number of feature points associated between the previous and current frames is four or more. For this reason, the patterned light beam projection flag is OFF, and a "three-dimensional measurement flag" is OFF as well. While the three-dimensional measurement flag is OFF, the orientation angle calculator 22 does not calculate the distance or orientation angle from the patterned light beam 32a. During cycles t4 to t6, the number of feature points associated between the previous and current frames is three. For this reason, the determination "NO" is made in step S501 in FIG. 8, and the patterned light beam projection flag is set ON in step S503. However, because the determination "YES" is made in step S507, the three-dimensional measurement flag remains OFF. During cycles t7 to t10, the number of feature points associated between the previous and current frames is four or more. For this reason, the patterned light beam projection flag is set OFF. During cycles t12 to t14, the number of feature points associated between the previous and current frames is less than three. For this reason, the determination "NO" is made in both steps S501 and S507. Thus, the patterned light beam projection flag and the three-dimensional measurement flag are set ON. Accordingly, the orientation angle calculator 22 calculates the distance or orientation angle.

Figure 10:
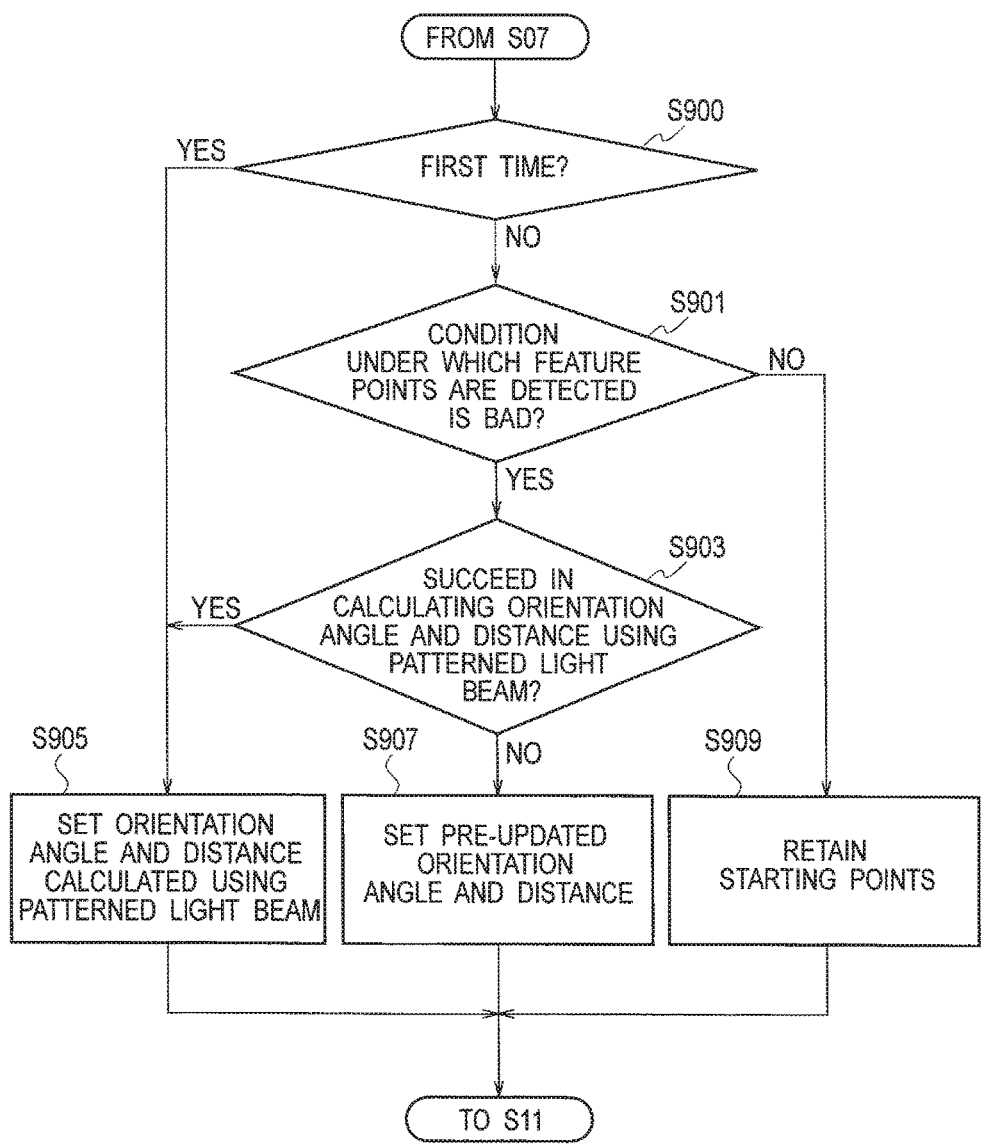
FIG. 10 is a flowchart showing a detailed procedure for step S09 shown in FIG. 7.

Referring to a flowchart in FIG. 10, descriptions will be provided for a detailed procedure for step S09 in FIG. 7. In step S900, the ECU 13 determines whether or not the current information process cycle is a first one. If the current information process cycle is a first one, that is to say, if no data on the previous information cycle is available, the procedure proceeds to a process in step S905. On the other hand, if the current information process cycle is not a first one, the procedure proceeds to a process in step S901.

In step S901, the detection condition determining section 30 determines whether or not the condition under which the feature point detector 23 detects the feature points $T_e$ is too bad to satisfy the second criterion. In other words, the detection condition determining section 30 determines whether or not the number of feature points $T_e$ associated between the previous and current frames is three or more. If the detection condition determining section 30 determines that the number is less than three (if YES in step S901), the procedure proceeds to step S903. If the detection condition determining section 30 determines that the number is three or more (if NO in step S901), the procedure proceeds to step S909.

In step S909, the ECU 13 retains the currently-set starting points of the integration operations as they are.

In step S903, the calculation state determining section 35 determines whether or not the state of the calculation of the distance and orientation angle by the orientation angle calculator 22 is too bad to satisfy the third criterion. For example, the calculation state determining section 35 determines whether or not the orientation angle calculator 22 succeeds in calculating the distance and orientation angle in step S509 in the same information process cycle. If the calculation state determining section 35 determines that the orientation angle calculator 22 succeeds (if YES in step S903), the procedure proceeds to step S905. If the calculation state determining section 35 determines that the orientation angle calculator 22 fails (if NO in step S903), the procedure proceeds to step S907.

In step S905, the ECU 13 sets the starting points of the integration operations at the distance and orientation angle calculated by the orientation angle calculator 22 in step S509, and the current position of the vehicle obtained at the time of the calculation. Using the distance and orientation angle as the starting points, the integration operations are started afresh. In addition, using the current position of the vehicle as the starting point, the other integration is started afresh.

In step S907, the ECU 13 sets the starting points of the integration operations at the distance and orientation angle employed in the previous information process cycle, and the current position of the vehicle used in the previous information process cycle. Using the distance and orientation angle as the starting points, the integration operations are started afresh. In addition, using the current position of the vehicle as the starting point, the other integration is started afresh. Thereafter, the procedure proceeds to a process of step S11 in FIG. 8.

The following operation/working-effect can be obtained from the first embodiment as described above.

Figure 11:
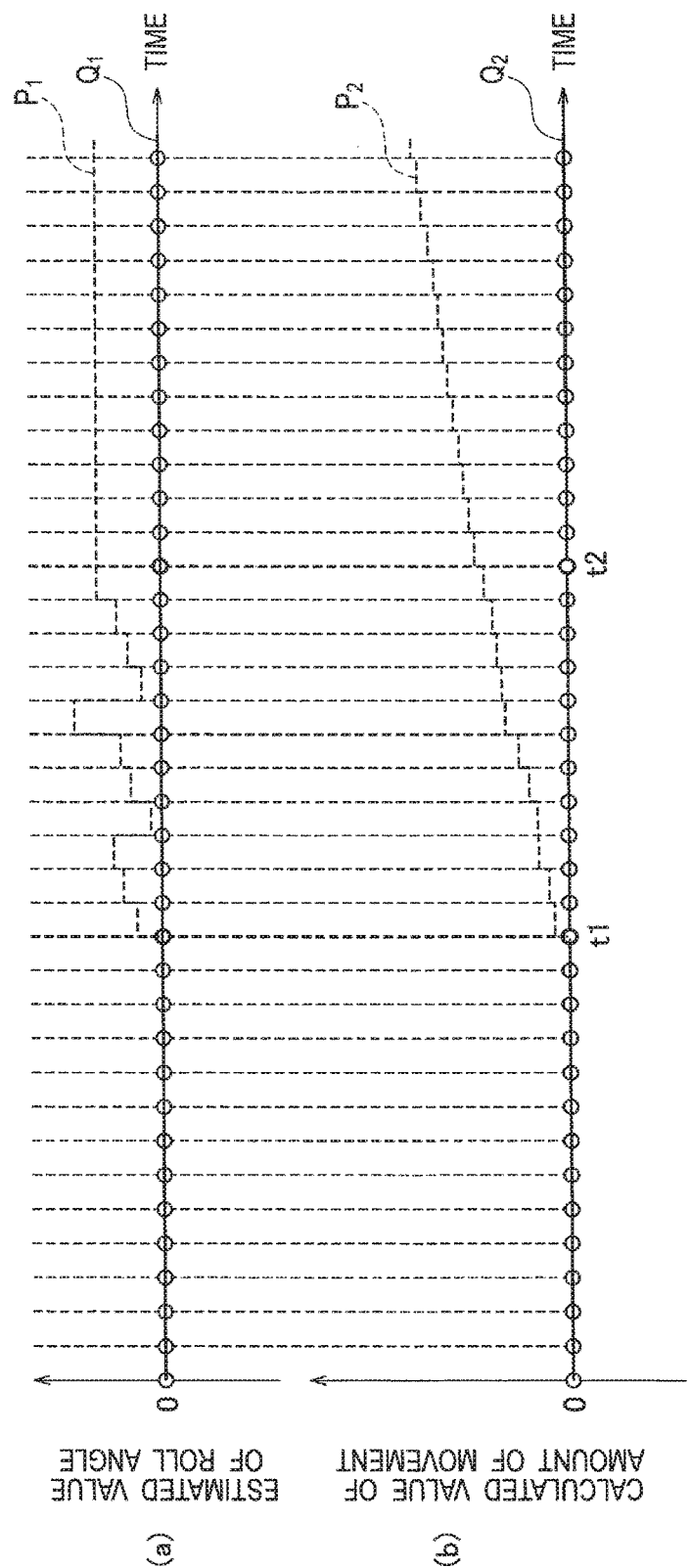
FIG. 11($a$) and FIG. 11($b$) are graphs respectively showing an example of an error in estimating a roll angle of the vehicle 10, and an example of an error in estimating an amount of movement of the vehicle 10 in a vehicle-width direction.

The detection of the multiple feature points under a bad condition results in a decrease in the accuracy with which the orientation change amount calculator 24 calculates the distance and orientation angle, and accordingly leads to an increase in the error in estimating the amount of movement of the vehicle 10. FIGS. 11(a) and 11(b) are graphs respectively showing an example of an error in estimating a roll angle (an example of the orientation angle) of the vehicle 10, and an example of an error in estimating the amount of movement (in the vehicle-width direction) of the vehicle 10. FIG. 11(a) shows a temporal change in a value of the roll angle which is calculated in a case where the vehicle 10 is running straightly on a flat road surface without inclinations, while FIG. 11(b) shows a temporal change in a value of the amount of movement which is calculated in the same case.

Reference signs "P1" and "P2" in FIGS. 11(a) and 11(b) respectively represent an estimated value of the roll angle and a calculated value of the amount of movement which are obtained in a comparative example where the starting point for calculating the amount of movement, and the starting points for performing the integration operation on the distance and orientation angle are kept unchanged regardless of the condition under which the multiple feature points are detected. Reference signs "Q1" and "Q2" in FIGS. 11(a) and 11(b) respectively represent a true value of the roll angle and a true value of the amount of movement. Since the vehicle 10 is running straightly, the true value (Q1) of the roll angle and the true value (Q2) of the amount of movement in the vehicle-width direction remain unchanged at zero. However, in a time interval from time t1 to time t2, an error occurs in the plane equation of the road surface and this error causes an error in estimating the roll angle, because the vehicle 10 runs on a concrete pavement which makes the multiple feature points detected under a bad condition. The error in the roll angle becomes reflected in the amount of movement in the vehicle-width direction. In the comparative example, regardless of the condition under which the multiple feature points are detected, the starting points for performing the integration operation on the roll angle are not reset at the distance and orientation angle calculated from the patterned light beam 32a, or the starting point for calculating the amount of movement is not reset at the current position of the vehicle obtained at the time of the calculation. This amplifies the error in the amount of movement of the vehicle 10.

According to the first embodiment, if the detection condition determining section 30 determines that the condition under which the multiple feature points are detected is too bad to satisfy the first criterion (if NO in step S501), the patterned light beam controller 27 projects the patterned light beam 32a. Thereby, the distance and orientation angle can be calculated from the position of the patterned light beam 32a. This makes it possible to start the integration operations anew using the starting points which are reset at the error-minimized distance and orientation angle calculated from the position of the patterned light beam 32a. Accordingly, the current position of the vehicle 10 can be estimated accurately and stably.

Moreover, the road surface which makes the multiple feature points detected under a bad condition includes, for example, a road surface which offers small numbers of patterns, dents and projections to be used as feature points. Since the road surface offering small numbers of patterns, dents and projections is very flat, less noise components are included in the distance and orientation angle calculated from the patterned light beam 32a. On the other hand, in the case of the road surface 31 from which the feature points can be detected under a good condition, positions on the road surface 31 off which the patterned light beam 32a is reflected are not stable due to dents and projections of the asphalt pavement, and accordingly more noise components are included in the distance and orientation angle calculated from the patterned light beam 32a. According to the first embodiment, the distance and orientation angle can be obtained accurately and stably by selectively either updating the distance and orientation angle using the feature points or calculating the distance and orientation angle using the patterned light beam 32a depending on the conditions under which the feature points are detected.

Furthermore, in some cases, the condition under which the feature points are detected becomes bad because of a reduction in the contrast of the image 38 due to a sudden change in the illuminance of the road surface 31. According to the first embodiment, no sensor, such as an illuminometer, need be additionally provided to the self-position calculating apparatus since the condition under which the feature points are detected is directly determined. This contributes to a reduction in costs, and a reduction in the weight of the apparatus.

According to the first embodiment, if the detection condition determining section 30 determines that the condition under which the multiple feature points are detected is good enough to satisfy the first criterion (if YES in step S501), the patterned light beam controller 27 stops projecting the patterned light beam 32a. The light projection can be limited to only the case where the condition under which the multiple feature points are detected is too bad to satisfy the first criterion. Thus, it is possible to minimize power consumption for the light projection by projecting the patterned light beam 32a only as needed.

The determination in step S05 in FIG. 7 to project the patterned light beam 32a (step S503) and the determination in step S05 in FIG. 7 to turn off the patterned light beam 32a (step S505) will be reflected on step S01 in the next information process cycle. For this reason, the calculation of the distance and orientation angle using the patterned light beam 32a requires the patterned light beam projection flag to be switched on in the previous cycle in advance. Accordingly, in the first embodiment, if the condition under which the multiple feature points are detected is too bad to satisfy the first condition, the patterned light beam projection flag is switched on (step S05). In the next cycle, the patterned light beam 32a is projected (step S01). Thereafter, in the same cycle, if the condition under which the multiple feature points are detected is too bad to satisfy the second condition (if NO in step S507), the orientation angle calculator 22 is capable of calculating the distance and orientation angle from the position of the patterned light beam 32a. Since as described above, using the multiple criteria (the first criterion and the second criterion), the determination is made on the condition under which the multiple feature points are detected, it is possible to appropriately control the timing of projecting the patterned light beam 32a and the timing of calculating the distance and orientation angle.

Second Embodiment

A second embodiment will be described using an example where the timing of calculating the distance and orientation angle using the patterned light beam 32a is controlled according to a length of time which elapses after the projection of the patterned light beam 32a is started. The hardware configuration of the self-position calculating apparatus of the second embodiment is the same as shown in FIG. 1. For this reason, descriptions for the hardware configuration will be omitted. In addition, the information process cycle to be repeatedly performed by the ECU 13 is the same as shown in FIG. 7, except for step S05. For this reason, descriptions for the information process cycle will be omitted too. These are the cases with third and fourth embodiments.

Figure 12:
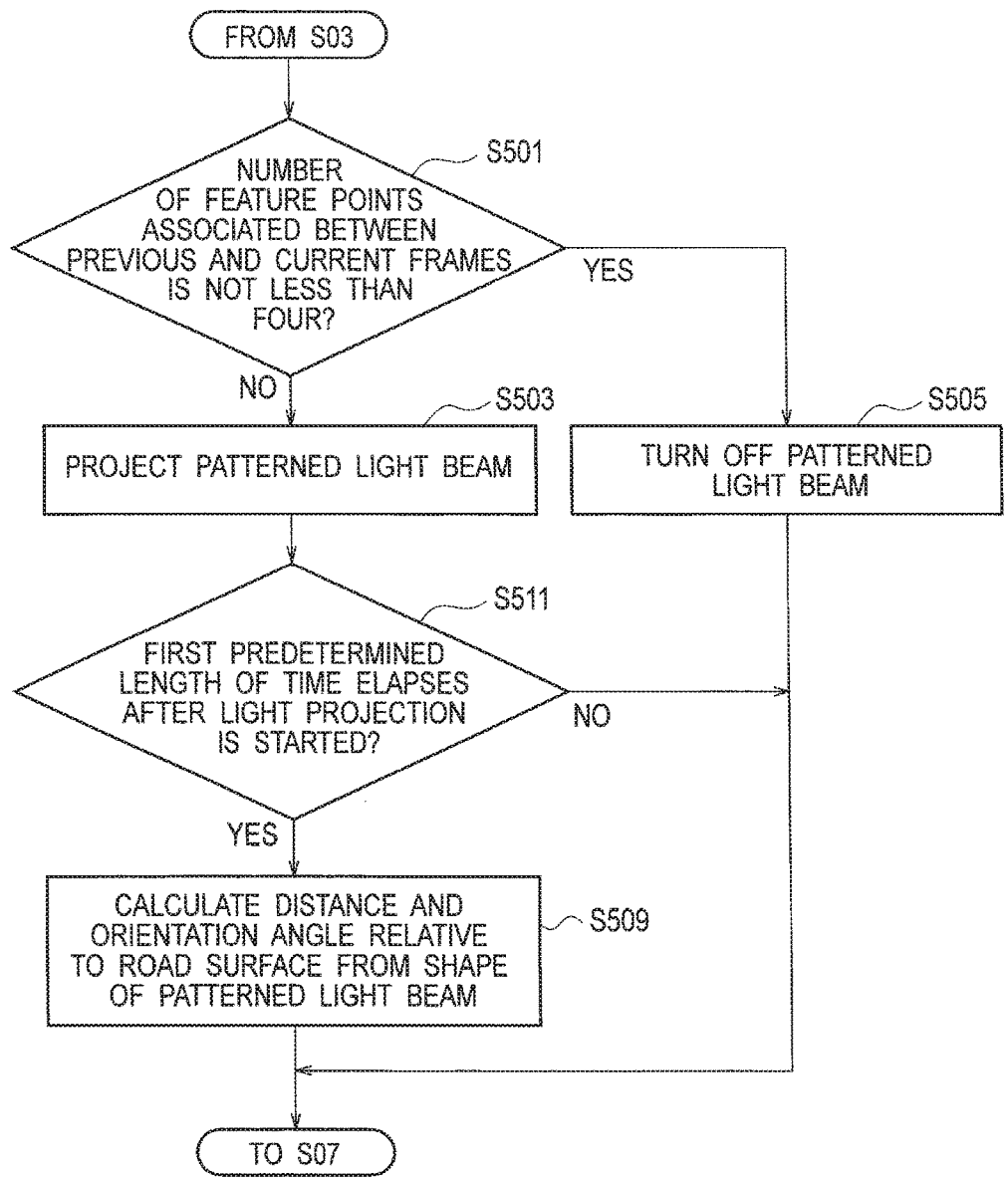
FIG. 12 is a flowchart showing a detailed procedure for step S05 of a second embodiment.

Referring to FIG. 12, descriptions will be provided for a detailed procedure for step S05 of the second embodiment. In a flowchart shown in FIG. 12, step S511 is performed instead of step S507 in FIG. 8. The other steps are the same as those shown in FIG. 8, and descriptions for such steps will be omitted. The ECU 13 measures the length of time which elapses after the projection of the patterned light beam 32a is started.

To put it specifically, the ECU 13 measures the length of time which elapses after the patterned light beam projection flag is switched from off to on in step S503. In step S511, the ECU 13 determines whether or not a first predetermined length of time elapses after the patterned light beam projection flag is thus switched. If the first predetermined length of time does not elapse (if NO in step S511), the procedure proceeds to step S07 without calculating the distance and orientation angle from the position of the patterned light beam 32a. On the other hand, if the first predetermined length of time elapses (if YES in step S511), the procedure proceeds to step S509, where the distance and orientation angle are calculated from the position of the patterned light beam 32a. Thereafter, the procedure proceeds to step S07.

Figure 13:
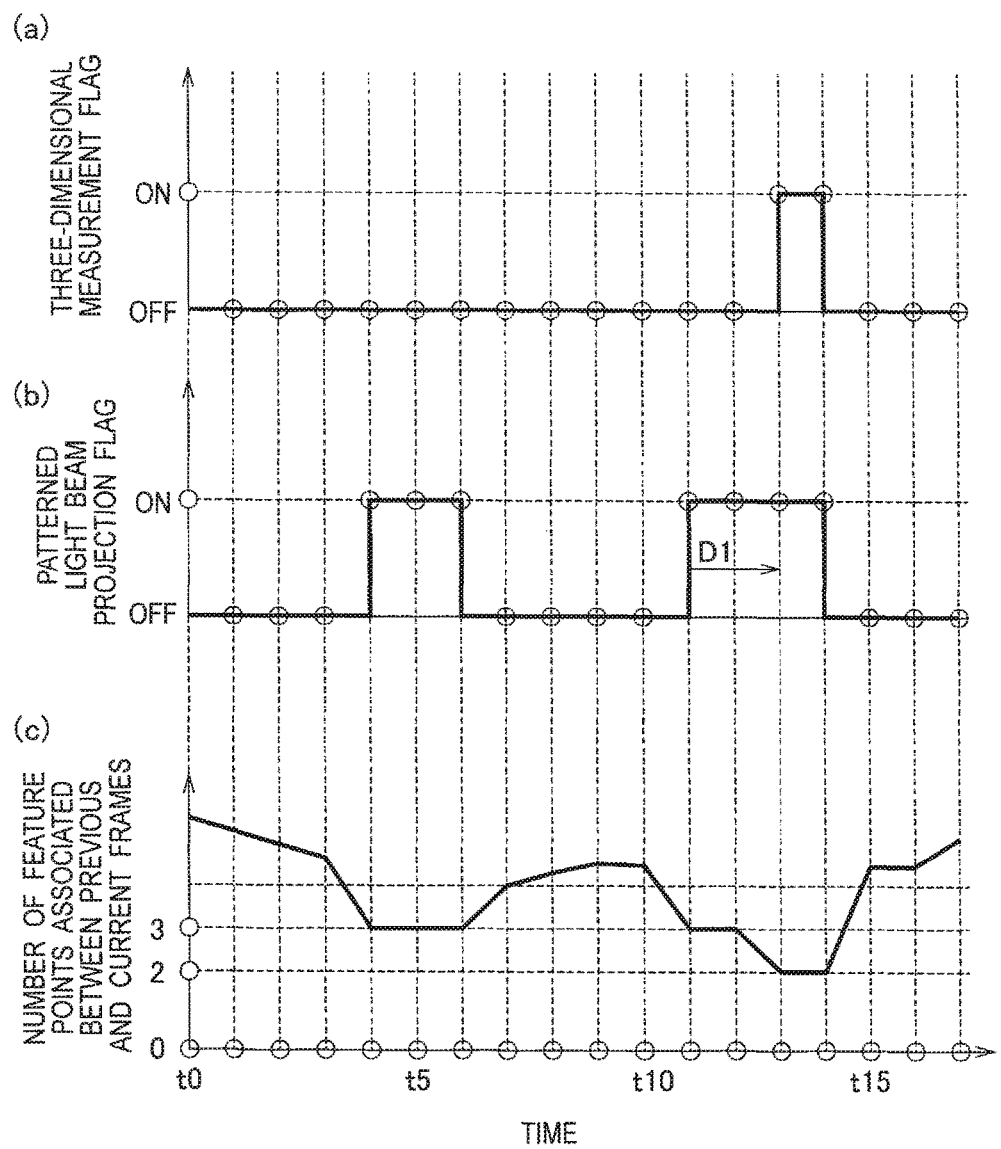
FIGS. 13($a$)-13($c$) are graphs showing an example of an information process to be performed in accordance with the flowchart shown in FIG. 12, with FIG. 13($a$) showing whether or not the orientation angle calculator 22 calculates the distance and orientation angle from the patterned light beam 32$a$, FIG. 13($b$) showing which state the patterned light beam projection flag is in and FIG. 13($c$) showing how many feature points are associated between previous and current frames.

It should be noted that as shown in FIG. 13, the first predetermined length of time may be set at a length of time corresponding to two information process cycles (D1), for example. In other words, the distance and orientation angle are not calculated either in an information process cycle (t11) in which the patterned light beam projection flag is switched from off to on, or in the next information process cycle (t12) (if NO in step S511); and it is not until an information process cycle (t13) after the next (namely, the second information process cycle from the information process cycle (t11)) that the distance and orientation angle are calculated (step S509 after YES in step S511).

As described above, the calculation of the distance and orientation angle using the patterned light beam 32a requires the patterned light beam projection flag to be switched on in the previous cycle in advance. In the second embodiment, the orientation angle calculator 22 starts to calculate the distance and orientation angle from the position of the patterned light beam 32a after the first predetermined length of time (D1) elapses from when the projection of the patterned light beam 32a is started. This makes it possible to adequately control the timing of projecting the patterned light beam 32a and the timing of calculating the distance and orientation angle.

Third Embodiment

A third embodiment will be described using an example where even when the condition under which the feature points are detected is determined as good enough to satisfy the first criterion after the projection of the patterned light beam 32a is started, the patterned light beam 32a continues being projected until a second predetermined length of time elapses after the determination.

If the detection condition determining section 30 determines that the condition under which the multiple feature points are detected is not worse than the first criterion, the patterned light beam controller 27 stops projecting the patterned light beam 32a after the second predetermined length of time elapses from when the detection condition determining section 30 makes the determination.

Figure 14:
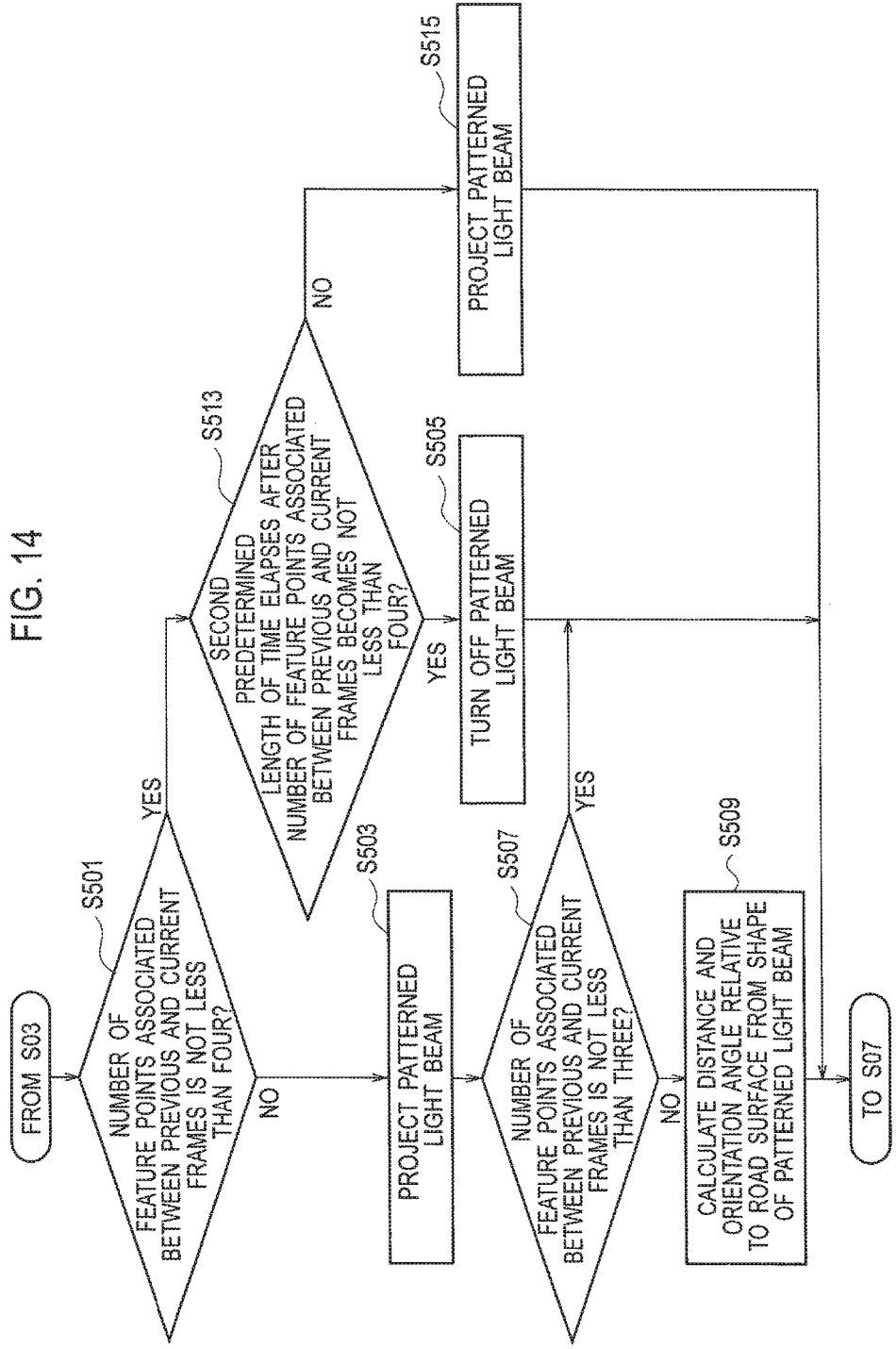
FIG. 14 is a flowchart showing a detailed procedure for step S05 of a third embodiment.

Referring to FIG. 14, descriptions will be provided for a detailed procedure for step S05 of the third embodiment. A flowchart shown in FIG. 14 includes step S513 and step S515 in addition to those shown in FIG. 8. The other steps are the same as those shown in FIG. 8, and descriptions for such steps will be omitted.

The ECU 13 measures a length of time which elapses after four or more feature points are determined as being associated between the previous and current frames. If four or more feature points are determined as being associated between the previous and current frames (if YES in step S501), the procedure proceeds to step S513, where the ECU 13 determines whether or not the second predetermined length of time elapses after four or more feature points are determined as being associated between the previous and current frames. If the second predetermined length of time elapses (if YES in step S513), the procedure proceeds to step S505, where the patterned light beam controller 27 switches the patterned light beam projection flag from on to off. On the other hand, if the second predetermined length of time does not elapse (if NO in step S513), the procedure proceeds to step S515, where the patterned light beam controller 27 keeps the patterned light beam projection flag on.

Figure 15:
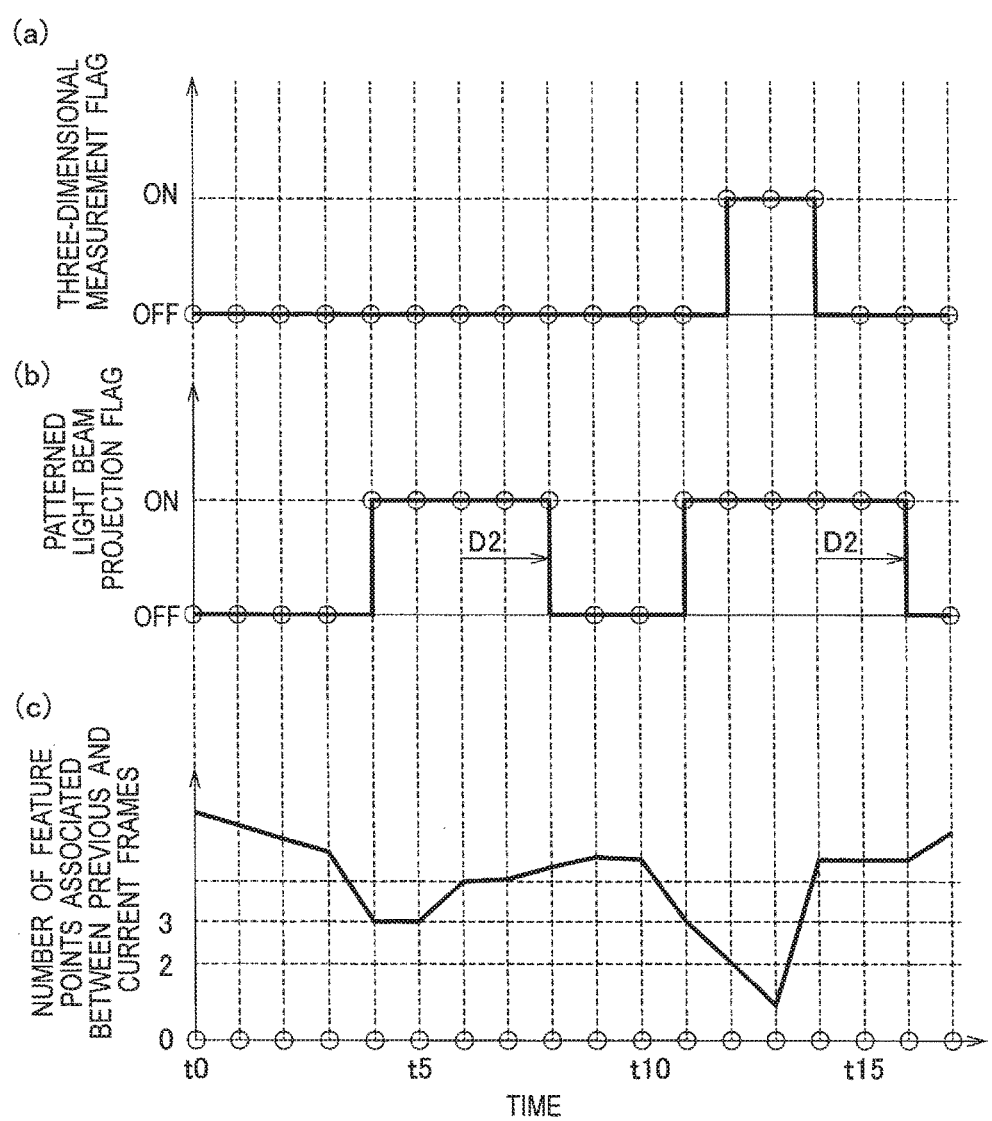
FIGS. 15($a$)-15($c$) are graphs showing an example of an information process to be performed in accordance with the flowchart shown in FIG. 14, with FIG. 15($a$) showing whether or not the orientation angle calculator 22 calculates the distance and orientation angle from the patterned light beam 32a, FIG. 15(b) showing which state the patterned light beam projection flag is in, and FIG. 15(c) showing how many feature points are associated between previous and current frames.

It should be noted that as shown in FIG. 15, the second predetermined length of time may be set at a length of time corresponding to two information process cycles (D2), for example. In other words, the patterned light beam projection flag is kept on in information process cycles (t6, t14) in which four or more feature points are associated between the previous and current frames, and in the next information process cycles (t7, t15) (step S515 after NO in step S513); and it is not until information process cycles (t8, t16) after the next (namely, the second information process cycle from the information process cycles (t6, t14)) that the patterned light beam projection flag is switched off (step S505 after YES in step S513).

Thereby, once the projection of the patterned light beam 32a is started, the patterned light beam 32a is not turned off immediately after the condition under which the multiple feature points are detected becomes better. To put it specifically, hysteresis (a history effect) can be provided to the condition under which the patterned light beam 32a is projected. This makes it possible to inhibit the patterned light beam 32a from flickering, and thus to mitigate irritation which is caused by the flickering of the patterned light beam 32a.

Fourth Embodiment

A fourth embodiment will be described using an example where hysteresis is provided to the condition where the patterned light beam 32a is turned off unlike in the third embodiment. Even when the condition under which the multiple feature points are detected is determined as becoming too bad to satisfy the first criterion after the patterned light beam 32a is turned off, the patterned light beam controller 27 keeps the patterned light beam 32a turned off until a third predetermined length of time elapses after the determination. If the detection condition determining section 30 determines that the condition under which the multiple feature points are detected is too bad to satisfy the first criterion, the patterned light beam controller 27 starts projecting the patterned light beam 32a after the third predetermined length of time elapses from when the detection condition determining section 30 makes the determination.

Figure 16:
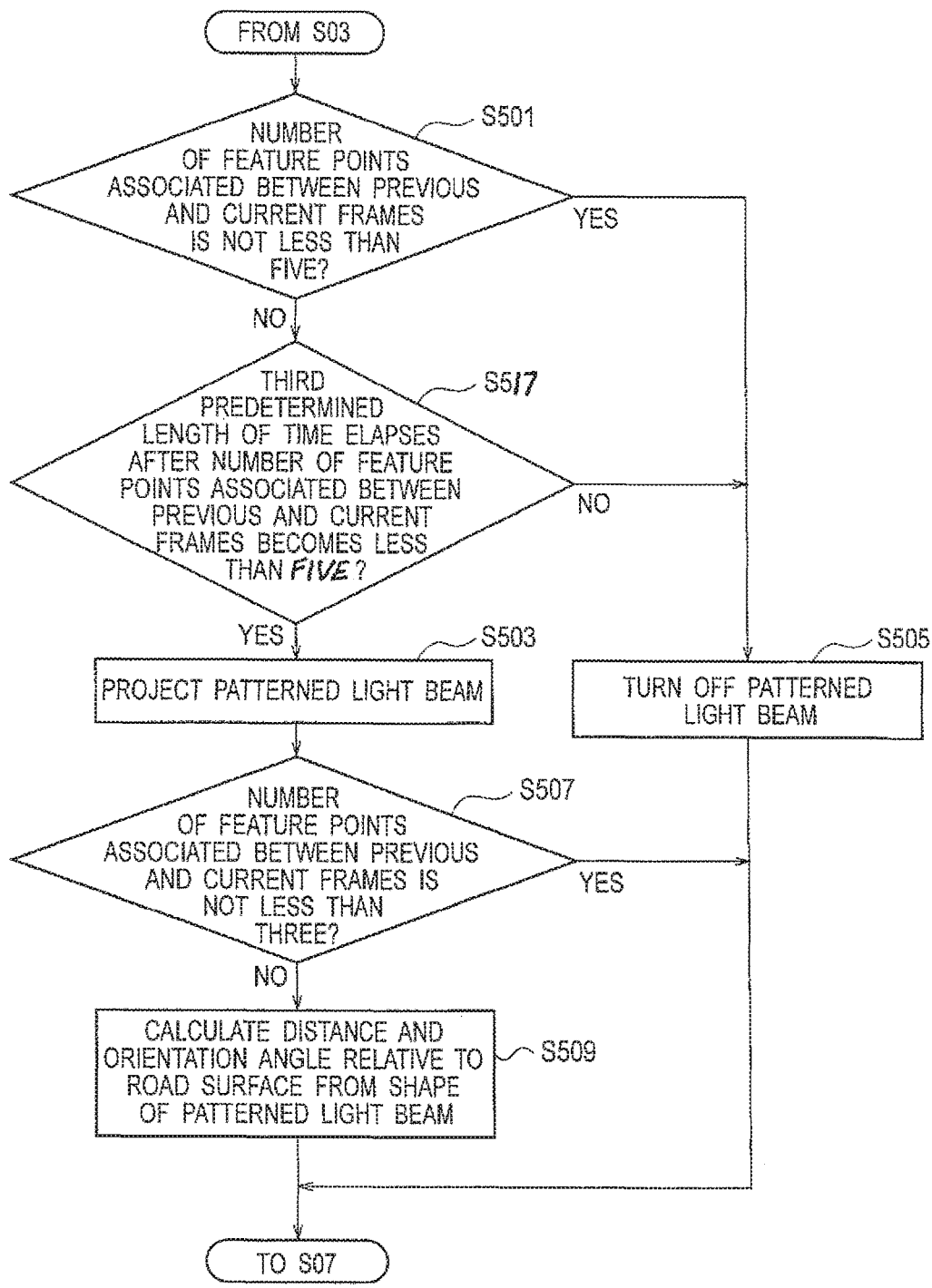
FIG. 16 is a flowchart showing a detailed procedure for step S05 of a fourth embodiment.

Referring to FIG. 16, descriptions will be provided for a detailed procedure for step S05 of the fourth embodiment. A flowchart shown in FIG. 16 includes step S517 in addition to those shown in FIG. 8. Furthermore, in step S501, it is determined whether or not the number of feature points associated between the previous and current frames is not less than five. To other words, if the number of feature points associated between the previous and current frames is not equal to or greater than five, the detection condition determining section 30 determines that the condition under which the multiple feature points are detected is too bad to satisfy the first criterion. The other steps are the same as those shown in FIG. 8. For this reason, descriptions for such steps will be omitted.

The ECU 13 measures a length of time which elapses after the number of feature points associated between the previous and current frames is determined as being not equal to or greater than five. If the number of feature points associated between the previous and current frames is determined as being not equal to or greater than five (if NO in step S501), the procedure proceeds to step S517, where the ECU 13 determines whether or not the third predetermined length of time elapses after the number of feature points associated between the previous and current frames is determined as being not equal to or greater than five. If the third predetermined length of time elapses (if YES in step S517), the procedure proceeds to step S503, where the patterned light beam controller 27 switches the patterned light beam projection flag on. On the other hand, if the third predetermined length of time does not elapse (if NO in step S517), the procedure proceeds to step S505, where the patterned light beam controller 27 keeps the patterned light beam projection flag off.

Figure 17:
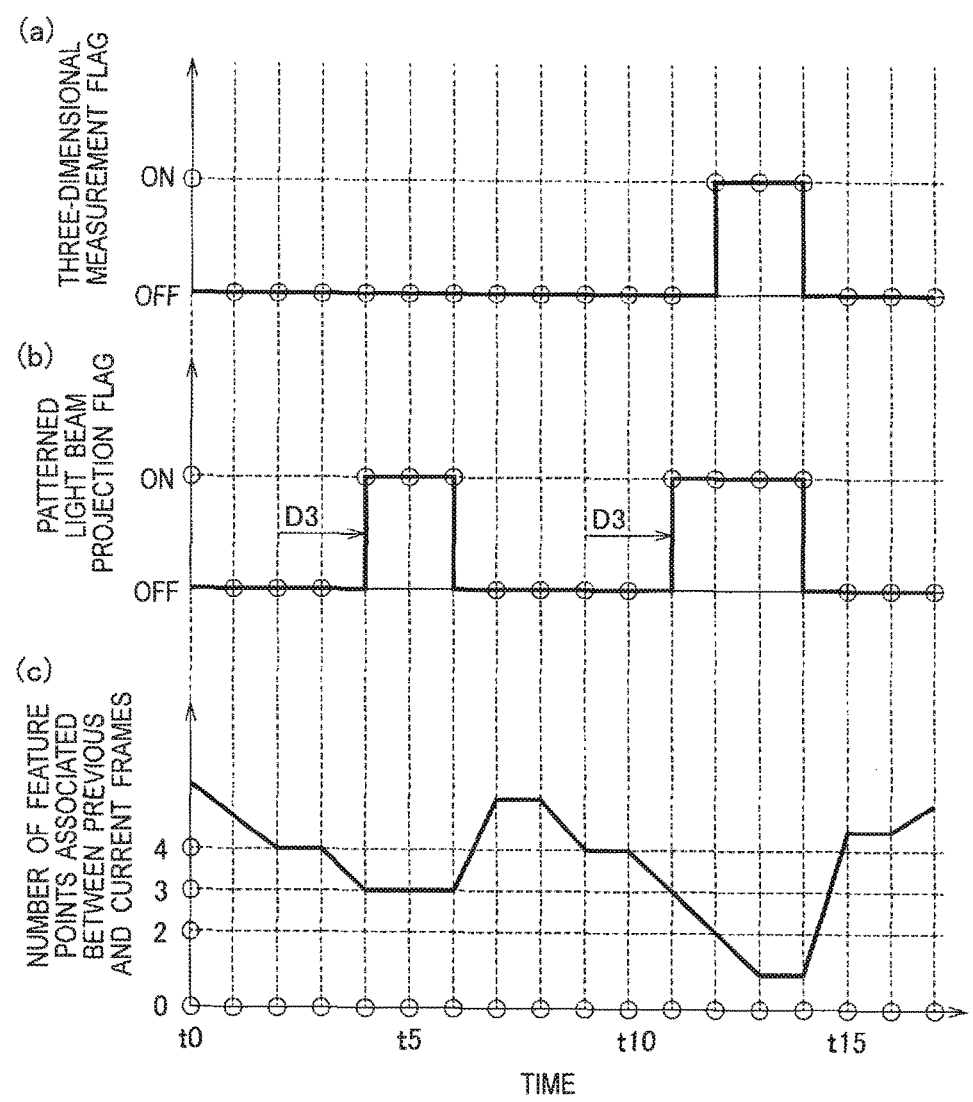
FIGS. 17(a)-17(c) are graphs showing an example of an information process to be performed in accordance with the flowchart shown in FIG. 16, with FIG. 17(a) shows whether or not the orientation angle calculator 22 calculates the distance and orientation angle from the patterned light beam 32a, FIG. 17(b) showing which state the patterned light beam projection flag is in, and FIG. 17(c) showing how many feature points are associated between previous and current frames.

It should be noted that as shown in FIG. 17, the third predetermined length of time may be set at a length of time corresponding to two information process cycles (D3), for example. In other words, the patterned light beam projection flag is kept off in information process cycles (t2, t9) in which the number of feature points associated between the previous and current frames becomes less than five, and in the next information process cycles (t3, t10) (step S505 after NO in step S517); and it is not until information process cycles (t4, t11) after the next (namely, the second information process cycle from the information process cycles (t2, t9)) that the patterned light beam projection flag is switched on (step S503 after YES in step S517).

Thereby, once the projection of the patterned light beam 32a is stopped, the projection of the patterned light beam 32a is not started immediately after the condition under which the multiple feature points are detected becomes worse. To put it specifically, hysteresis (a history effect) can be provided to the condition under which the patterned light beam 32a is turned off. This makes it possible to inhibit the patterned light beam 32a from flickering, and thus to mitigate irritation which is caused by the flickering of the patterned light beam 32a.

Although the first to fourth embodiments have been described as above, neither of the descriptions and drawings constituting parts of the disclosure shall be construed as limiting the present invention. The disclosure will make various alternative embodiments, examples and operational techniques clear to those skilled in the art.

Although FIG. 2 shows the example where the camera 12 and the light projector 11 are installed in the front of the vehicle 10, the camera 12 and the light projector 11 may be installed in the sides, rear or bottom of the vehicle 10. Furthermore, although FIG. 2 shows the four-wheeled passenger car as an example of the vehicle 10 of the embodiments, the present invention is applicable to all the moving bodies (vehicles), such as motorbikes, trucks and special vehicles for transporting construction machines, as long as feature points on road surfaces and wall surfaces can be captured from such moving bodies.

REFERENCE SIGNS LIST 10 vehicle
11 light projector
12 camera (image capturing unit)
21 patterned light beam extractor
22 orientation angle calculator 23 feature point detector
24 orientation change amount calculator
26 self-position calculator
27 patterned light beam controller
30 road surface condition determining section
31 road surface
32a, 32b patterned light beam
35 calculation state determining section
Te feature point

The invention claimed is:

1. A self-position calculating apparatus comprising:
a light projector configured to project a patterned light beam onto a road surface around a vehicle;
a camera installed in the vehicle, and configured to capture an image of the road surface around the vehicle including an area onto which the patterned light beam is projected; and
a controller configured to:
calculate an orientation angle of the vehicle relative to the road surface from a position of the patterned light beam on the image obtained by the camera;
calculate an amount of change in the orientation of the vehicle based on temporal changes in a plurality of feature points on the road surface which are detected from the image obtained by the camera;
calculate current position and orientation angle of the vehicle by adding the amount of change in the orientation to initial position and orientation angle of the vehicle;
determine under what condition the plurality of feature points are detected; and
control how the light projector projects the patterned light beam, wherein
if the condition under which the plurality of feature points are detected does not satisfy a first criterion, the controller projects the patterned light beam.

2. The self-position calculating apparatus according to claim 1, wherein if the condition under which the plurality of feature points are detected satisfies the first criterion, the controller stops projecting the patterned light beam.

3. The self-position calculating apparatus according to claim 1, wherein if the condition under which the plurality of feature points are detected does not satisfy a second criterion lower than the first criterion, the controller calculates the orientation angle of the vehicle relative to the road surface from the position of the patterned light beam.

4. The self-position calculating apparatus according to claim 1, wherein after a first predetermined length of time elapses from when projection of the patterned light beam is initiated, the controller starts to calculate the orientation angle of the vehicle relative to the road surface from the position of the patterned light beam.

5. The self-position calculating apparatus according to claim 1, wherein if the condition under which the plurality of feature points are detected does not satisfy the first criterion, the controller stops projecting the patterned light beam after a second predetermined length of time elapses from when the determination is made.

6. The self-position calculating apparatus according to claim 1, wherein if the condition under which the plurality of feature points are detected does not satisfy the first criterion, the controller starts to project the patterned light beam after a third predetermined length of time elapses from when the determination is made.

7. A self-position calculating method comprising:
projecting a patterned light beam onto a road surface around a vehicle, by a light projector installed in the vehicle;
capturing an image of the road surface around the vehicle including an area onto which the patterned light beam is projected, by a camera installed in the vehicle;
calculating an orientation angle of the vehicle relative to the road surface from a position of the patterned light beam on the image, by a controller of the vehicle;
calculating an amount of change in the orientation of the vehicle based on temporal changes in a plurality of feature points on the road surface which are detected from the image, by the controller; and
calculating current position and orientation angle of the vehicle by adding the amount of change in the orientation to initial position and orientation angle of the vehicle, by the controller, wherein
the light projector projects the patterned light beam if the controller determines that a condition under which the plurality of feature points are detected does not satisfy a first criterion.

* * * * *